US012031683B2

United States Patent
Tanabe et al.

(10) Patent No.: US 12,031,683 B2
(45) Date of Patent: Jul. 9, 2024

(54) HYDROGEN GAS FILLING DEVICE

(71) Applicant: Tokico System Solutions, Ltd., Kanagawa (JP)

(72) Inventors: Minoru Tanabe, Kakegawa (JP); Ryohei Yamamoto, Kakegawa (JP)

(73) Assignee: TOKICO SYSTEM SOLUTIONS, LTD., Kanagawa (JP)

( * ) Notice: Subject to any disclaimer, the term of this patent is extended or adjusted under 35 U.S.C. 154(b) by 63 days.

(21) Appl. No.: 17/793,518

(22) PCT Filed: Mar. 15, 2021

(86) PCT No.: PCT/JP2021/010377
§ 371 (c)(1),
(2) Date: Jul. 18, 2022

(87) PCT Pub. No.: WO2021/200070
PCT Pub. Date: Oct. 7, 2021

(65) Prior Publication Data
US 2023/0073042 A1  Mar. 9, 2023

(30) Foreign Application Priority Data

Mar. 31, 2020 (JP) ................................. 2020-062306

(51) Int. Cl.
*F17C 5/00* (2006.01)
(52) U.S. Cl.
CPC ...... *F17C 5/007* (2013.01); *F17C 2205/0323* (2013.01); *F17C 2205/0352* (2013.01);
(Continued)
(58) Field of Classification Search
CPC .............. F17C 5/007; F17C 2205/0323; F17C 2205/0352; F17C 2205/037;
(Continued)

(56) References Cited

U.S. PATENT DOCUMENTS

2016/0229680 A1* 8/2016 Cornett ............... F16L 55/1015

FOREIGN PATENT DOCUMENTS

CN 107300076 10/2017
JP 2004-353821 12/2004
(Continued)

OTHER PUBLICATIONS

International Search Report issued in International Patent Application No. PCT/JP2021/010377, dated Apr. 27, 2021, along with an English translation thereof.
(Continued)

*Primary Examiner* — Timothy L Maust
*Assistant Examiner* — Christopher M Afful
(74) *Attorney, Agent, or Firm* — Greenblum & Bernstein, P.L.C.

(57) ABSTRACT

An emergency breakaway coupling, which is a disconnect coupling, is configured such that a first coupler and a second coupler thereof are connected under normal conditions and the first coupler and the second coupler are disconnected during an emergency. A disconnect detecting device includes a detecting piece and a moving piece that are arranged in the emergency breakaway coupling. The disconnect detecting device detects the disconnect of the emergency breakaway coupling due to the movement of the moving piece from the detecting piece. The detecting piece and the moving piece are arranged in the emergency breakaway coupling such that a moving direction O2-O2 of the moving piece moving from the detecting piece is in parallel with a disconnecting direction O1-O1 of the first coupler disconnecting from the second coupler.

7 Claims, 9 Drawing Sheets

(52) U.S. Cl.
CPC .. *F17C 2205/037* (2013.01); *F17C 2221/012* (2013.01); *F17C 2227/0355* (2013.01); *F17C 2250/03* (2013.01); *F17C 2250/043* (2013.01); *F17C 2250/0478* (2013.01); *F17C 2265/065* (2013.01); *F17C 2270/0168* (2013.01)

(58) Field of Classification Search
CPC ........ F17C 2221/012; F17C 2227/0355; F17C 2250/03; F17C 2250/043; F17C 2250/0478; F17C 2265/065; F17C 2270/0168
See application file for complete search history.

(56) References Cited

FOREIGN PATENT DOCUMENTS

| | | |
|---|---|---|
| JP | 2006-17196 | 1/2006 |
| JP | 2006-214512 | 8/2006 |
| JP | 2007-120717 | 5/2007 |
| JP | 2008-232418 | 10/2008 |
| JP | 2017-44304 | 3/2017 |

OTHER PUBLICATIONS

China Office Action issued in China Patent Application No. 202180009372.9, dated Nov. 24, 2022, together with English translation thereof.

\* cited by examiner

HYDROGEN GAS FILLING DEVICE

TECHNICAL FIELD

The present invention relates to a hydrogen gas filling device that fills hydrogen gas into a fuel tank (a tank to be filled) in a vehicle, for example.

BACKGROUND ART

For example, Patent Document 1 describes a hydrogen gas filling device that fills high-pressure hydrogen gas into a fuel tank (a tank to be filled) mounted on a vehicle such as a fuel-cell automobile. The hydrogen gas filling device of this type according to the conventional technology fills hydrogen gas into the fuel tank via a hose from a dispenser housing side in a state where a filling nozzle disposed in a tip end of the hose is connected to the fuel tank in the vehicle. Here, for example, in a case where the vehicle starts up in error in a state where the filling nozzle is being connected to the vehicle in the middle of or after filling the hydrogen gas, the hose is pulled by a strong force. In this case, in order to be capable of disconnecting the hose in the middle, the hydrogen gas filling device is preferably configured to be provided with a disconnect coupling that disconnects a hose on the dispenser housing side from a hose on the filling nozzle side.

PRIOR ART DOCUMENT

Patent Document

Patent Document 1: Japanese Patent Laid-Open No. 2017-44304 A

SUMMARY OF THE INVENTION

Incidentally, in a case of being configured to be provided with the disconnect coupling, it is preferable that it is possible to detect that this disconnect coupling is disconnected. In this case, it is not preferable to take labors and time in attaching a detecting device for detecting that the disconnect coupling is disconnected.

An object of the present invention is to provide a hydrogen gas filling device that can detect that a disconnect coupling is disconnected and reduce labors and time in attaching a detecting device for detecting that the disconnect coupling is disconnected.

A hydrogen gas filling device according to an aspect of the present invention that includes a filling nozzle connected to a gas supply pipeline via a gas supply connection line and uses the filling nozzle to fill hydrogen gas into a fuel tank in a vehicle, comprises: a disconnect coupling that includes a first coupler connected to the gas supply connection line on the side of the filling nozzle and a second coupler connected to the gas supply connection line on the side of the gas supply pipeline, wherein the first coupler and the second coupler are connected under normal conditions and the first coupler and the second coupler are disconnected during an emergency; and a detecting device configured to detect that the first coupler and the second coupler are disconnected, characterized in that: the detecting device includes: a detecting part disposed in the disconnect coupling on the side of the second coupler; and a moving part disposed in the disconnect coupling on the side of the first coupler, wherein the first coupler and the second coupler are connected to connect the detecting part and the moving part, and following the disconnect between the first coupler and the second coupler, the detecting part and the moving part are separated to detect the disconnect between the first coupler and the second coupler.

According to the aspect of the present invention, the disconnect of the disconnect coupling can be detected and the labors and time for attaching the detecting device can be reduced.

BRIEF DESCRIPTION OF THE DRAWINGS

FIG. 2 is an outline view showing a dispenser unit, a filling hose (a gas supply connection line), an emergency breakaway coupling (disconnect coupling), a disconnect detecting device (a detecting device) and the like.

MODE FOR CARRYING OUT THE INVENTION

Figure 5:
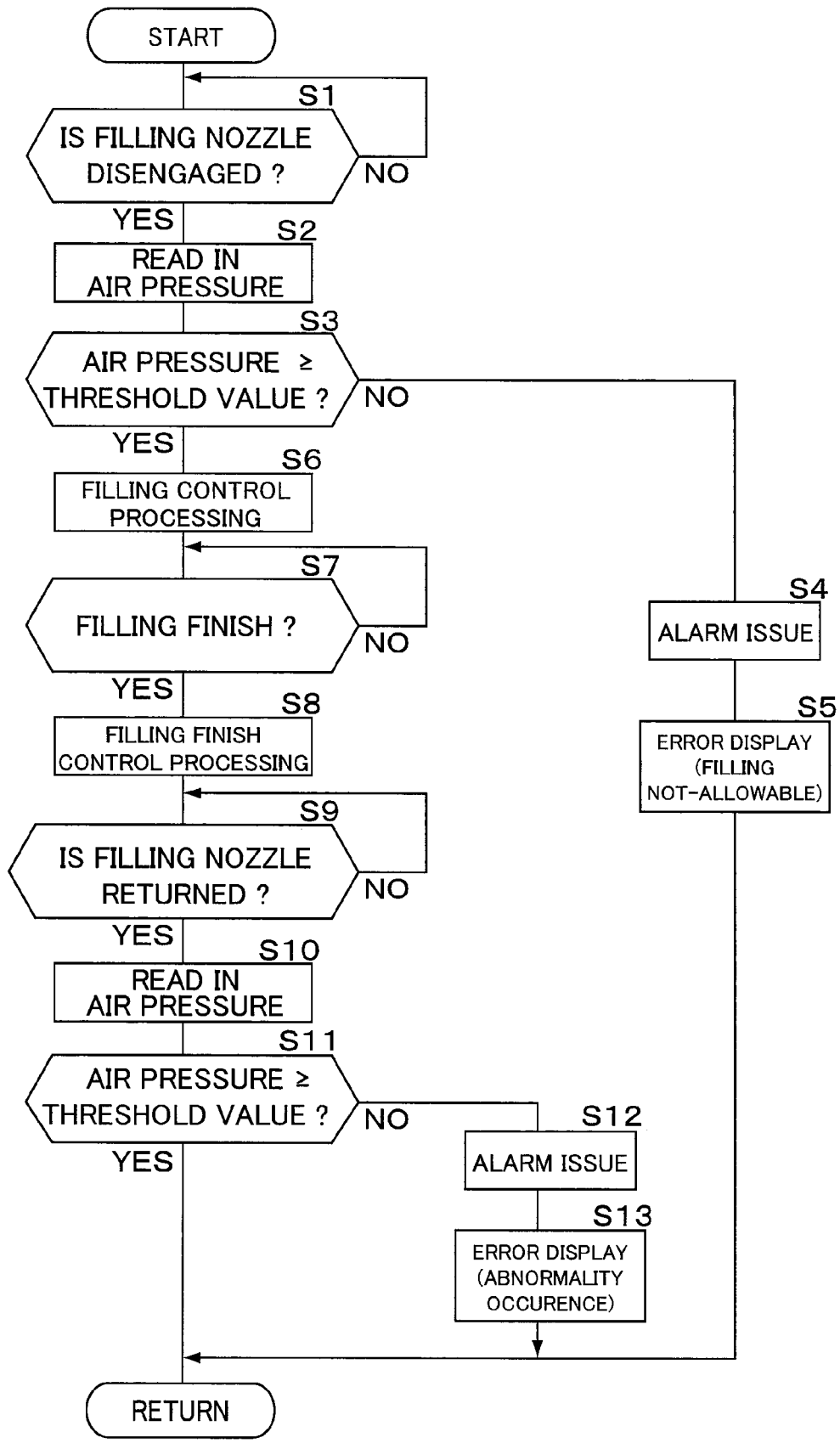
FIG. 5 is a flow chart showing control processing to be executed in the control device in FIG. 1.

A hydrogen gas filling device according to embodiments will be described below in detail with reference to the accompanying drawings by taking a vehicular hydrogen gas filling device for filling hydrogen gas into a fuel tank (a tank to be filled) in a vehicle as an example thereof. It should be noted that each step of a flow chart as shown in FIG. 5 is indicated by using notation of "S" (for example, step 1="S1").

Figure 1:
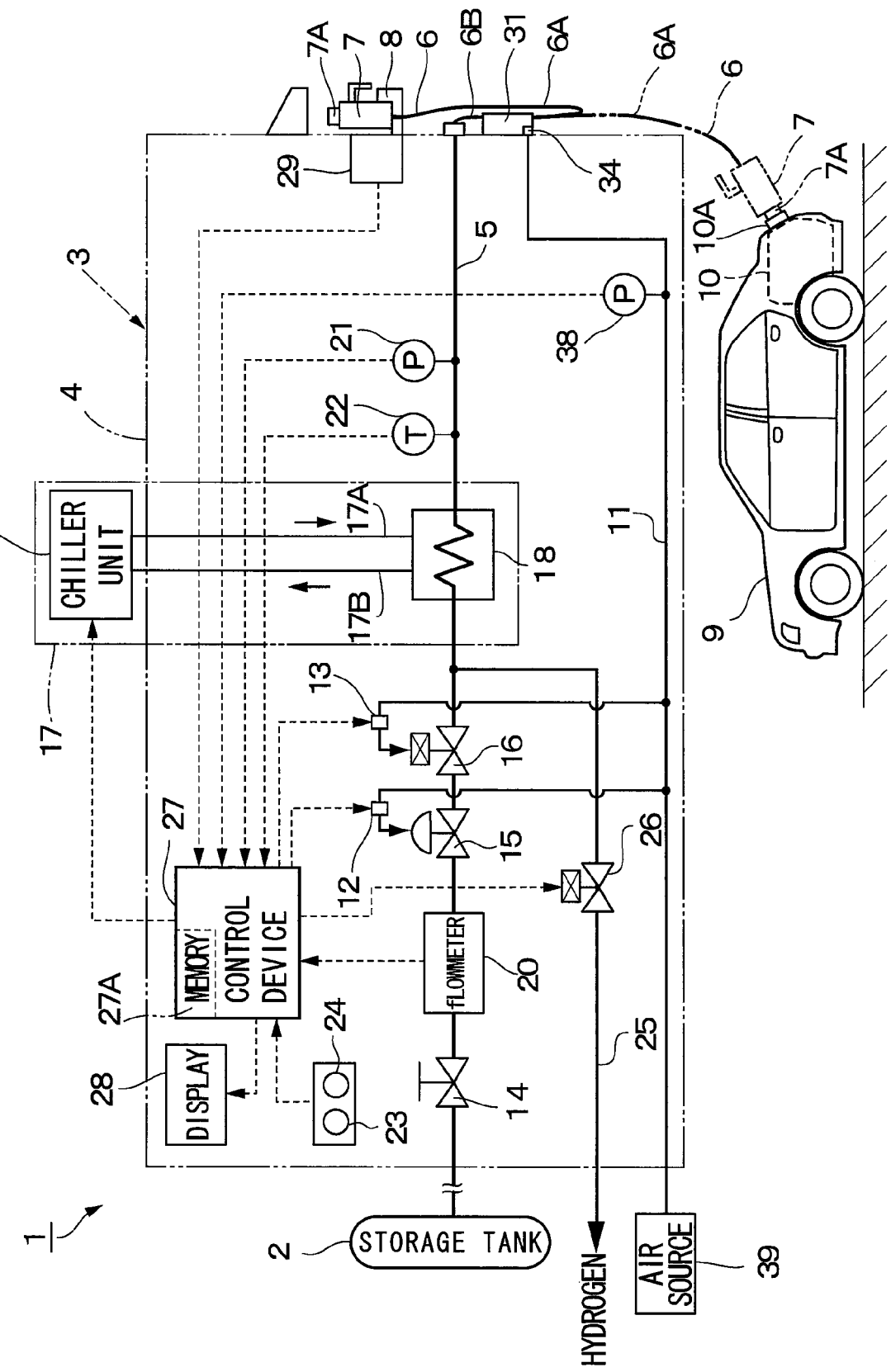
FIG. 1 is an overall configuration diagram schematically showing a hydrogen gas filling device according to a first embodiment.

FIGS. 1 to 5 show a first embodiment. In FIG. 1, a hydrogen gas filling device 1 fills (charges) compressed hydrogen gas (filling gas) into a fuel tank 10 (hereinafter, referred to as a tank 10 to be filled) in a vehicle 9, such as a fuel-cell automobile. The vehicular hydrogen gas filling device 1 is installed in a facility (fuel supply facility) called a hydrogen gas supply station. The hydrogen gas filling device 1 is configured to include a gas accumulator 2 as a gas storage part (storage tank) for storing hydrogen gas compressed to a high pressure, a dispenser unit 3 as a filling mechanism for filling hydrogen gas from the gas accumulator 2 into the tank 10 to be filled in the vehicle 9, and a hydrogen gas supply pipeline 5 which extends from the gas accumulator 2 to the inside of a dispenser housing 4 of the dispenser unit 3.

The gas accumulator 2 is a supply source of hydrogen gas for storing the hydrogen gas compressed to a high pressure. The gas accumulator 2 is connected to the dispenser unit 3. The gas accumulator 2 forms the gas storage part in the upstream side of the hydrogen gas supply pipeline 5 for storing the hydrogen gas compressed to the high pressure. The dispenser unit 3 includes the dispenser housing 4, a filling hose 6 as a gas supply connection line, a filling nozzle 7, a nozzle retainer 8, a flow rate adjusting valve 15, a shutoff valve 16, a heat exchanger 18, a flowmeter 20, a pressure sensor 21, a temperature sensor 22, a filling start switch 23, a filling stop switch 24, a depressurization valve 26, and a control device 27 (control circuit) as a controller (control unit).

The dispenser housing 4 as a housing forms a building as an outline of the dispenser unit 3, and is formed, for example, in a cuboid shape (boxy shape) long in an upper-lower direction. The hydrogen gas supply pipeline 5, the flow rate adjusting valve 15, the shutoff valve 16, the heat exchanger 18, the pressure sensor 21, the temperature sensor 22, the control device 27 and the like are accommodated in the dispenser housing 4. A displaying part 28 as a display is disposed on a front surface side, which faces a worker and a customer carrying out a filling work of hydrogen gas, of the dispenser housing 4. The nozzle retainer 8 in which the filling nozzle 7 is removably retained is disposed on a side surface side of the dispenser housing 4. The nozzle retainer 8 corresponds to a retaining part for retaining the filling nozzle 7. The filling nozzle 7 is retained in the nozzle retainer 8 at the non-filling time of hydrogen gas (that is, the waiting time of the filling work). At the time of filling the hydrogen gas, the filling nozzle 7 is removed from the nozzle retainer 8 by a worker of the filling work.

As shown in FIG. 1, the hydrogen gas supply pipeline 5 is installed in the dispenser housing 4 and supplies pressurized hydrogen gas from the gas accumulator 2 toward the filling hose 6-side. The hydrogen gas supply pipeline 5 is disposed such that the gas accumulator 2-side becomes the upstream side and the filling hose 6-side becomes the downstream side. The filling hose 6 as a hose extending to an exterior of the dispenser housing 4 is connected to an end part of the hydrogen gas supply pipeline 5 on the downstream side. The filling hose 6 is formed using a pressure hose having flexibility. The filling hose 6 has a base end that is connected to the downstream side of the hydrogen gas supply pipeline 5. The filling nozzle 7 is disposed on a tip end of the filling hose 6 to be connected to a filling port 10A of the tank 10 to be filled.

Figure 2:
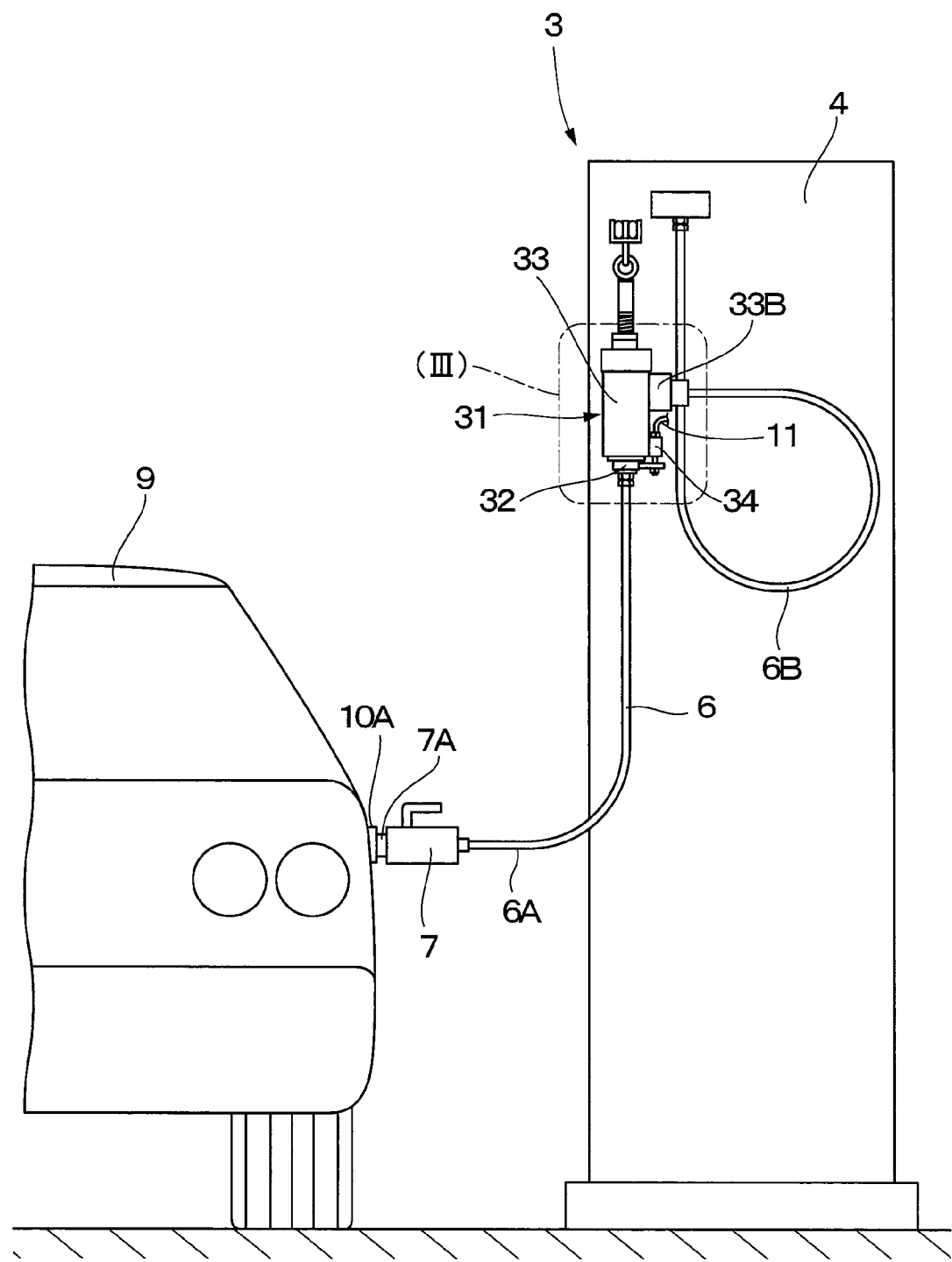

As shown in FIG. 2, the filling hose 6 is provided with a first hose 6A on the filling nozzle 7-side and a second hose 6B as a hose on the dispenser housing 4-side (in other words, on the hydrogen gas supply pipeline 5-side). The first hose 6A and the second hose 6B are connected via an emergency breakaway coupling 31 to be described later. The filling nozzle 7 is connected to a tip end side of the first hose 6A on the filling nozzle 7-side. A base end side of the first hose 6A is connected to a first coupler 32 of the emergency breakaway coupling 31. A second coupler 33 of the emergency breakaway coupling 31 is connected to a tip end side of the second hose 6B on the dispenser housing 4-side. A base end side of the second hose 6B is connected to the downstream end of the hydrogen gas supply pipeline 5. The filling hose 6 configures a hydrogen gas filling path together with the hydrogen gas supply pipeline 5. The gas filling path is a path (pipeline) for filling gas into the tank 10 to be filled mounted on the vehicle 9 traveling by using hydrogen gas as fuel.

The filling nozzle 7 is connected to the tip end side of the filling hose 6 (first hose 6A) in an air-tight state and configures a so-called charging coupling. The filling nozzle 7 is connected to the dispenser housing 4 (more specifically, to the hydrogen gas supply pipeline 5) via the filling hose 6 (the hoses 6A and 6B). An on-off valve (not shown) is housed in the filling nozzle 7. The on-off valve is switched to "an open position" permitting flow of hydrogen gas and "a closed position" shutting off the flow of hydrogen gas. It should be noted that a check valve may be disposed on the filling nozzle 7 instead of or together with the on-off valve. The check valve permits the flow of the hydrogen gas from the filling nozzle 7 into the tank 10 to be filled and blocks the flow of the hydrogen gas from the tank 10 to be filled into the filling nozzle 7.

A tip end side of the filling nozzle 7 is formed as a connection coupler 7A, which is removably connected to the filling port 10A as a connection port of the tank 10 to be filled. That is, the connection coupler 7A of the filling nozzle 7 is removably connected to the filling port 10A of the tank 10 to be filled when the hydrogen gas is supplied into the tank 10 to be filled in the vehicle 9 via a pipeline (not shown) in the filling nozzle 7. In addition, the filling nozzle 7 is provided with a lock mechanism (not shown) by which the filling nozzle 7 is locked to be capable of being engaged to/disengaged from the filling port 10A of the tank 10 to be filled. As a result, the filling nozzle 7 can be suppressed from being inadvertently disengaged from the filling port 10A at the filling of hydrogen gas.

The high-pressure hydrogen gas in the gas accumulator 2 is filled into the tank 10 to be filled in the vehicle 9 via the hydrogen gas supply pipeline 5, the filling hose 6 and the filling nozzle 7 in a state where the filling nozzle 7 is locked to the filling port 10A of the tank 10 to be filled by the lock mechanism. That is, the hydrogen gas filling device 1 is provided with the filling nozzle 7 and fills the hydrogen gas into the tank 10 to be filled in the vehicle 9 by using this filling nozzle 7.

As shown in FIG. 1, an inlet valve 14 to be opened/closed by a manual operation, for example, the flow rate adjusting valve 15 as a control valve that is connected to the downstream side of the inlet valve 14 and adjustably controls a flow rate of fuel flowing in the hydrogen gas supply pipeline 5 by being opened/closed by the control device 27 and the shutoff valve 16 as a valve device connected closer to the downstream side than the flow rate adjusting valve 15 respectively are arranged in the dispenser unit 3 to be positioned in the middle of the hydrogen gas supply pipeline 5. It should be noted that the arrangement (the mounting order) of the flowmeter 20, the flow rate adjusting valve 15 and the shutoff valve 16 that are arranged toward the downstream side from the upstream side in the hydrogen gas supply pipeline 5 is not limited to the order as shown in FIG. 1.

The inlet valve 14 is positioned in the dispenser housing 4 and is disposed in the middle of the hydrogen gas supply pipeline 5. The inlet valve 14 is attached as needed and may be omitted if unnecessary. The flow rate adjusting valve 15 and the shutoff valve 16 configure control equipment that controls the flow (that is, the flow rate and pressure) of hydrogen gas flowing in the hydrogen gas supply pipeline 5. The flowmeter 20, the pressure sensor 21 and the temperature sensor 22 configure measurement equipment that measures conditions (that is, the flow rate, pressure and temperature) of the hydrogen gas flowing in the hydrogen gas supply pipeline 5.

The flow rate adjusting valve 15 disposed in the dispenser unit 3 is a valve device of a pneumatic operation type, for example, and opens by supply of air, and a valve opening degree thereof is adjusted by controlling a control pressure (air pressure) with a control signal (control current). The flow rate adjusting valve 15 is controlled to any opening degree by a command based upon a control program of the control device 27 to variably control the flow rate and hydrogen gas pressure of the hydrogen gas flowing in the hydrogen gas supply pipeline 5. That is, the flow rate adjusting valve 15 opens by supply of compressed air or compressed air (instrumentation air or drive gas) of compressed nitrogen gas and the like via an air supply pipeline 11 as a drive gas supply line. Therefore, the air supply pipeline 11 for supplying the compressed air is connected to the flow rate adjusting valve 15. In this case, the compressed air to be supplied to the flow rate adjusting valve 15 is adjusted by an electromagnetic valve 12 disposed in the middle of the air supply pipeline 11. The electromagnetic valve 12 is a normal-closed type electromagnetic valve regularly in a closed position, for example, and is connected to the control device 27. A valve opening degree of the electromagnetic valve 12 is controlled based upon the control current supplied from the control device 27. The flow rate adjusting valve 15 is adjusted to a necessary opening degree by supply of the compressed air via the electromagnetic valve 12 of which the valve opening degree is controlled based upon the control current supplied from the control device 27.

The shutoff valve 16 is a valve device of a pneumatic operation type disposed in the middle section (for example, between the flow rate adjusting valve 15 and a cooler 17) of the hydrogen gas supply pipeline 5. The shutoff valve 16 is opened/closed based upon the control signal from the control device 27 to permit or shut off the flow of the hydrogen gas (fuel gas or filling gas) in the hydrogen gas supply pipeline 5. That is, the control device 27 executes the opening/closing control in relation to the flow rate adjusting valve 15 and the shutoff valve 16 at the time of filling the hydrogen gas into the tank 10 to be filled in the vehicle 9 via the filling nozzle 7 or stopping (finishing) the filling of the hydrogen gas thereinto. The shutoff valve 16 also opens by supply of the compressed air (instrumentation air or drive gas) via the air supply pipeline 11 as a drive gas supply line. Therefore, the air supply pipeline 11 is connected to the shutoff valve 16 to supply the compressed air. The shutoff valve 16 is a normal-closed valve of maintaining a closed valve state when the compressed air equal to or more than a predetermined pressure is not supplied. In this case, the compressed air to be supplied to the shutoff valve 16 is controlled by an electromagnetic valve 13 disposed in the middle of the air supply pipeline 11. The electromagnetic valve 13 is a normal-closed type electromagnetic valve regularly in a closed valve position, for example, and is connected to the control device 27. The electromagnetic valve 13 opens by supply of the control current from the control device 27. The shutoff valve 16 opens by supply of the compressed air via the electromagnetic valve 13 of which the opening/closing is controlled based upon the control current supplied from the control device 27. At this time, the shutoff valve 16, in a case where compressed air supplied thereto has a predetermined pressure (or higher than the predetermined pressure), is maintained in a valve opening state by this compressed air.

The cooler 17 is a cooling device for cooling the hydrogen gas flowing in the hydrogen gas supply pipeline 5. The cooler 17 cools the hydrogen gas in the middle position of the hydrogen gas supply pipeline 5 for suppressing a temperature rise of the hydrogen gas to be filled into the tank 10 to be filled. That is, the cooler 17 cools the hydrogen gas to be filled into the vehicle 9 (tank 10 to be filled) via the hydrogen gas supply pipeline 5. The cooler 17 includes the heat exchanger 18 disposed in the middle section (for example, between the shutoff valve 16 and the temperature sensor 22) of the hydrogen gas supply pipeline 5, and a chiller unit 19 connected via refrigerant pipelines 17A, 17B to the heat exchanger 18 and provided with drive mechanisms (not shown) of, for example a compressor, a pump and the like.

The refrigerant pipeline 17A on the supply side for supplying refrigerant (for example, a liquid containing ethylene glycol or the like) from the chiller unit 19 toward the heat exchanger 18-side and the refrigerant pipeline 17B on the return side for returning the refrigerant after the heat exchanging from the heat exchanger 18 toward the chiller unit 19 are arranged in the cooler 17. The chiller unit 19 circulates the refrigerant via the refrigerant pipelines 17A, 17B between the chiller unit 19 and the heat exchanger 18. Thereby, the heat exchanger 18 in the cooler 17 performs the heat exchange between the hydrogen gas flowing in the hydrogen gas supply pipeline 5 and the refrigerant to reduce a temperature of the hydrogen gas to be supplied toward the filling hose 6 to a specified temperature (for example, −33° C. to −40° C.).

A Coriolis flowmeter 20 is disposed in the dispenser housing 4 to be positioned in the middle of the hydrogen gas supply pipeline 5 to measure a mass flow rate of a liquid to be measured. The flowmeter 20 measures a flow rate (mass flow rate) of the hydrogen gas flowing in the hydrogen gas supply pipeline 5 between the inlet valve 14 and the flow rate adjusting valve 15, for example and outputs the measurement result (detection signal) to the control device 27. The control device 27 calculates a filling quantity of the hydrogen gas in relation to the tank 10 to be filled in the vehicle 9 and displays a delivery quantity (corresponding to a fill quantity) of hydrogen gas fuel on the displaying part 28 or the like. Thereby, the display content is notified to a customer, for example.

The pressure sensor 21 is disposed in the hydrogen gas supply pipeline 5 closer to the downstream side (that is, the filling nozzle 7-side) than the shutoff valve 16. The pressure sensor 21 detects a pressure of the hydrogen gas to be supplied from the gas accumulator 2 (that is, a pressure in the tank 10 to be filled or a pressure in the middle of the pipeline substantially corresponding to the pressure in the tank 10 to be filled). The pressure sensor 21 measures the pressure in the hydrogen gas supply pipeline 5 in the vicinity of the filling nozzle 7, and outputs a detection signal in accordance with the measured pressure to the control device 27.

The temperature sensor 22 is disposed in the middle of the hydrogen gas supply pipeline 5 to be positioned between the shutoff valve 16 and the pressure sensor 21. The temperature sensor 22 detects a temperature of the hydrogen gas flowing in the hydrogen gas supply pipeline 5, and outputs the detection result (detection signal) to the control device 27. It should be noted that an arrangement relationship between the temperature sensor 22 and the pressure sensor 21 is not limited to the arrangement as shown in FIG. 1, but, for example, an arrangement therebetween reverse to each other may be adopted.

The filling start switch 23 and the filling stop switch 24 are arranged on the front surface side of the dispenser housing 4, for example. The filling start switch 23 and the filling stop switch 24 are switches that can manually be operated by a worker of a fuel supply station (hydrogen station), for example. The filling start switch 23 is operated at the time of starting the fill of the hydrogen gas and the filling stop switch 24 is operated at the time of stopping the fill of the hydrogen gas in the middle of filling the hydrogen gas. The filling start switch 23 and the filling stop switch 24 respectively output signals in accordance with the operating states to the control device 27. Thereby, the control device 27 opens or closes the shutoff valve 16 in response to these signals.

A depressurization pipeline 25 is disposed to be branched from the hydrogen gas supply pipeline 5 closer to the downstream side than the shutoff valve 16 to depressurize a gas pressure from the filling hose 6-side, for example. The depressurization valve 26, which is a valve device of an electromagnetic or a pneumatic operation type, for example, is disposed in the middle of the depressurization pipeline 25. When the filling work of the hydrogen gas using the filling hose 6 (filling nozzle 7) is completed and the shutoff valve 16 is closed, the depressurization valve 26 is controlled to open based upon a signal from the control device 27. The depressurization valve 26 is a normal closed valve.

In a case of removing the connection coupler 7A of the filling nozzle 7 from the filling port 10A of the tank 10 to be filled, it is necessary to reduce the pressure in the filling hose 6 to an atmospheric pressure level. Therefore, at the completion time of the gas filling work, a tip end side of the depressurization pipeline 25 is opened to the atmosphere by temporarily opening the depressurization valve 26. Thereby, the hydrogen gas on the filling hose 6-side is released to an exterior to reduce the pressure in the filling hose 6 to the atmospheric pressure level. As a result, the connection coupler 7A of the filling nozzle 7 can be removed from the filling port 10A of the tank 10 to be filled.

The control device 27 is formed with the controller (control unit) configured to control the flow rate adjusting valve 15 (electromagnetic valve 12), the shutoff valve 16 (electromagnetic valve 13), the depressurization valve 26, the displaying part 28 and the like. The control device 27 controls fuel supply into the tank 10 to be filled as a filling target by controlling the flow rate adjusting valve 15 (electromagnetic valve 12) and the shutoff valve 16 (electromagnetic valve 13). As described later, the control device 27 determines that the emergency breakaway coupling 31 is disconnected and issues the notification. The control device 27 is formed with a microcomputer having a CPU (calculation device), a memory 27A (memory device), a timer and the like. Programs for filling control processing as shown in FIG. 5 and the like are stored in the memory 27A in the control device 27.

The flowmeter 20, the pressure sensor 21, the temperature sensor 22, a humidity sensor (not shown), the filling start switch 23, the filling stop switch 24, a nozzle detector 29, a pressure sensor 38 to be described later and the like are connected to the input side of the control device 27. On the other hand, the flow rate adjusting valve 15 (electromagnetic valve 12), the shutoff valve 16 (electromagnetic valve 13), the depressurization valve 26, the displaying part 28 and the like are connected to the output side of the control device 27.

The displaying part 28 is disposed on the front surface side of the dispenser housing 4. The displaying part 28 is disposed in a height position where a worker performing the filling work of the hydrogen gas is easy to visualize it and performs information display and the like necessary for the filling work of the hydrogen gas. In addition, in a case where the emergency breakaway coupling 31 to be described later is disconnected, the warning (error) is displayed on the displaying part 28. Operating parts of the filling start switch 23, the filling stop switch 24 and the like in addition to the displaying part 28 are arranged on the front surface side of the dispenser housing 4.

The nozzle detector 29 is disposed on the nozzle retainer 8. The nozzle detector 29 detects whether or not the filling nozzle 7 is retained. The nozzle detector 29 is formed by a switch of a two-position switching type, for example. The nozzle detector 29 is a switch (nozzle switch), for example, and is connected to the control device 27. The nozzle detector 29, for example when the filling nozzle 7 is retained in the nozzle retainer 8, is pushed and moved by the filling nozzle 7 to be switched to an on-state. The nozzle detector 29, when the filling nozzle 7 is removed (detached) from the nozzle retainer 8, is switched to an off-state.

The nozzle detector 29 outputs a detection signal (an on-signal or an off-signal) corresponding to whether or not the filling nozzle 7 is retained in the nozzle retainer 8 to the control device 27. The nozzle detector 29 is not limited to being disposed on the nozzle retainer 8 in the dispenser housing 4-side but may be disposed in the filling nozzle 7-side. In any case, the filling nozzle 7 is retained in the nozzle retainer 8 of the dispenser unit 3 at the non-filling time of the hydrogen gas (that is, at the waiting time of the filling work). That is, when the filling work for filling the hydrogen gas into the tank 10 to be filled in the vehicle 9 is finished, the filling nozzle 7 is returned back to the nozzle retainer 8 and is retained in an accommodating state.

The vehicle 9 to be driven and traveled by using the hydrogen gas as fuel is configured by a four-wheeled car (passenger car) as shown in FIG. 1, for example. The vehicle 9 is provided with a drive device (not shown) including a fuel cell and an electric motor, for example, the tank 10 to be filled as shown in a dotted line in FIG. 1, and the like. The tank 10 to be filled is configured as a container of a pressure structure for filling the hydrogen gas and is mounted on the rear part side of the vehicle 9, for example. The tank 10 to be filled is disposed, not limited to the rear part side of the vehicle 9 but may be disposed to the front part side or the central part side of the vehicle 9.

The tank 10 to be filled is provided with the filling port 10A (receptacle) on which the connection coupler 7A of the filling nozzle 7 is removably attached. The filling of the hydrogen gas is performed into the tank 10 to be filled in the vehicle 9 in a state where the filling nozzle 7 is air-tightly connected to the filling port 10A. At this time, the filling nozzle 7 is locked by a locking mechanism in such a way as to inadvertently be not disengaged from the filling port 10A.

Incidentally, in a case where the vehicle 9 starts up in error in a state where the filling nozzle 7 is connected to the filling port 10A of the tank 10 to be filled in the vehicle 9 in the middle of or after filling the hydrogen gas, the filling hose 6 is pulled by a strong force. In this case, the emergency breakaway coupling 31 that disconnects the first hose 6A on the filling nozzle 7-side from the second hose 6B on the dispenser housing 4-side is preferably provided as to be capable of disconnecting the filling hose 6 along the path. The emergency breakaway coupling 31 is a device (disconnect coupling) that disconnects by receiving a tension load via the filling hose 6 and blocks the hydrogen gas from being released by a valve body (shutoff valve) installed therein when the vehicle starts up in error.

Here, in a case of being provided with the emergency breakaway coupling 31, it is preferable to be capable of detecting that the emergency breakaway coupling 31 is disconnected. For being capable of detecting that the emergency breakaway coupling 31 is disconnected, it is considered to dispose a pressure sensor in the filling hose 6 for detecting a change in pressure of the hydrogen gas in the filling hose 6, for example. In this case, by detecting a reduction in pressure or the like by the pressure sensor when the emergency breakaway coupling 31 is disconnected, it is possible to detect that the emergency breakaway coupling 31 is disconnected. However, for example, when the emergency breakaway coupling 31 is disconnected at the waiting time an inner pressure of the hydrogen gas is not applied into the filling hose 6, there is a possibility that the disconnect cannot be detected. At the time of connecting the emergency breakaway coupling 31 to the filling hose 6, the work for attaching the pressure sensor in the inside of the filling hose 6 in addition to the work for connecting the emergency breakaway coupling 31 to the filling hose 6 becomes necessary, which makes the work for attaching the sensor for detecting the disconnect complicated.

On the other hand, for being capable of detecting that the emergency breakaway coupling 31 is disconnected, it is considered to dispose a position sensor in the emergency breakaway coupling 31 for detecting a positional change between couplers of the emergency breakaway coupling 31, for example. In this case also, however, at the time of connecting the emergency breakaway coupling 31, the work for attaching the position sensor around the emergency breakaway coupling 31 in addition to the work for connecting the emergency breakaway coupling 31 becomes necessary. That is, it takes labors and time in attaching the position sensor before or after connecting the emergency breakaway coupling 31. Thereby, the work for attaching the position sensor becomes troublesome. Further, for being capable of detecting that the emergency breakaway coupling 31 is disconnected, it is considered to dispose, for example, a member that fractures or breaks apart following the disconnect of the emergency breakaway coupling 31 and detect a state change of the member based upon the fracturing or breaking apart. In this case also, however, at the time of connecting the emergency breakaway coupling 31, the work for attaching the member that fractures or breaks apart in addition to the work for connecting the emergency breakaway coupling 31 becomes necessary. Thereby, the work for attaching the member that fractures or breaks apart becomes troublesome. In addition, when the emergency breakaway coupling 31 is disconnected, it is necessary to replace the fractured or broken-apart member. In any case, it is not preferable that the labors and time are required for the work attaching the member that fractures or breaks apart.

Therefore, the following configuration is adopted in the embodiment. Thereby, the detection on the disconnect of the emergency breakaway coupling 31 is made possible regardless of in the middle of or at the waiting time of filling the hydrogen gas (in other words, whether or not the inner pressure by the hydrogen gas is applied), and labors and time on the work for attaching the sensor for detecting the disconnect of the emergency breakaway coupling 31 are reduced. That is, in the embodiment at the disconnect time of the emergency breakaway coupling 31 as the disconnect coupling, a detecting device (disconnect detecting device 34) having a sensor function capable of detecting this disconnect is disposed, and at the time of detecting the disconnect by this detecting device, the notification (issue of an alarm) is made to prohibit the filling. Hereinafter, an explanation will be made of the emergency breakaway coupling 31 as the disconnect coupling and the disconnect detecting device 34 as the detecting device.

The emergency breakaway coupling 31 is installed in the vicinity of a worker performing the filling operation. Specifically, as shown in FIG. 2, the emergency breakaway coupling 31 is disposed in the middle of the filling hose 6 and is suspended in the dispenser housing 4. In the embodiment, the disconnect detecting device 34 is provided for detecting the disconnect of the emergency breakaway coupling 31. That is, the hydrogen gas filling device 1 in the embodiment is provided with the emergency breakaway coupling 31 that disconnects during an emergency, and the disconnect detecting device 34 configured to detect that the emergency breakaway coupling 31 is disconnected.

The emergency breakaway coupling 31 is disposed in the middle position of the filling hose 6 as the gas supply connection line, that is, between the first hose 6A on the filling nozzle 7-side and the second hose 6B on the dispenser housing 4-side (in other words, on the hydrogen gas supply pipeline 5-side). The emergency breakaway coupling 31 connects the first hose 6A and the second hose 6B and is a safety device configured to disconnect during an emergency. The emergency breakaway coupling 31, when the vehicle 9 starts up in error in the middle of or after filling the hydrogen gas, disconnects on a basis that the filling hose 6 is pulled in a strong force. The emergency breakaway coupling 31 is provided therein with the valve body (shutoff valve) that blocks the hydrogen gas from being released from the filling hose 6 when disconnected. The second hose 6B may be the hydrogen gas supply pipeline 5 extending from the inside of the dispenser housing 4 as a housing.

That is, the emergency breakaway coupling 31 includes the first coupler 32 connected to the first hose 6A on the filling nozzle 7-side and the second coupler 33 connected to the second hose 6B on the dispenser housing 4-side (in other words, on the hydrogen gas supply pipeline 5-side). The emergency breakaway coupling 31 is configured such that the first coupler 32 and the second coupler 33 are connected under normal conditions and the first coupler 32 and the second coupler 33 are disconnected during an emergency. The first coupler 32 has an insert part 32A (refer to FIG. 4) to be removably inserted in an attaching hole 33A of the second coupler 33 and a hose attaching part 32B that is positioned in a base end side of the insert part 32A and to which the first hose 6A is fixedly connected. A shutoff valve (not shown) is disposed in the inside of the insert part 32A to block the hydrogen gas from being released from the inside of the first hose 6A when the first coupler 32 is disconnected from the second coupler 33. The insert part 32A is provided with a valve spring 32C to close a port of the shutting-off part (valve) when the insert part 32A gets out of the attaching hole 33A of the second coupler 33.

The second coupler 33 is formed in a cylindrical shape and opens to the first coupler 32. That is, the second coupler 33 is provided with the attaching hole 33A in which the insert part 32A of the first coupler 32 is removably inserted. A hose attaching part 33B, to which the second hose 6B is fixedly connected, is disposed on the side surface of the second coupler 33. The hose attaching part 33B is perpendicular to a center axis O1-O1 of the attaching hole 33A. A shutoff valve (not shown) is disposed in the inside of the second coupler 33 to block the hydrogen gas from being released from the inside of the second hose 6B when the second coupler 33 is disconnected from the first coupler 32.

At the time of connecting the first coupler 32 and the second coupler 33, the insert part 32A is inserted in the attaching hole 33A in a state where a center axis O1-O1 of the insert part 32A of the first coupler 32 corresponds to the center axis O1-O1 of the attaching hole 33A of the second coupler 33, and the first coupler 32 and the second coupler 33 are fixed to each other by a share pin (not shown). When a force in the direction of disconnecting the first coupler 32 from the second coupler 33 is applied therebetween, that is, a predetermined or more force is applied in the direction of the center axis O1-O1, the share pin fractures and the insert part 32A gets out of the attaching hole 33A, whereby the first coupler 32 and the second coupler 33 are disconnected. Thereby, the release of the hydrogen gas due to damages of the filling hose 6 or the like can be blocked. The share pin, at the time a large force is applied between the first coupler 32 and the second coupler 33, that is, in such a manner that the first coupler 32 and the second coupler 33 can be disconnected during an emergency, is a temporal connection member for temporarily connecting the first coupler 32 and the second coupler 33. As the temporal connection member, the pin structure as the share pin can be adopted, and besides, there may be adopted an adhesion bond of which adhesion surfaces are separated when a predetermined or more force is applied thereto. That is, the first coupler 32 and the second coupler 33 can be connected by various kinds of temporal connection members by which the first coupler 32 and the second coupler 33 can be disconnected at the time a predetermined force is applied therebetween.

Figure 3:
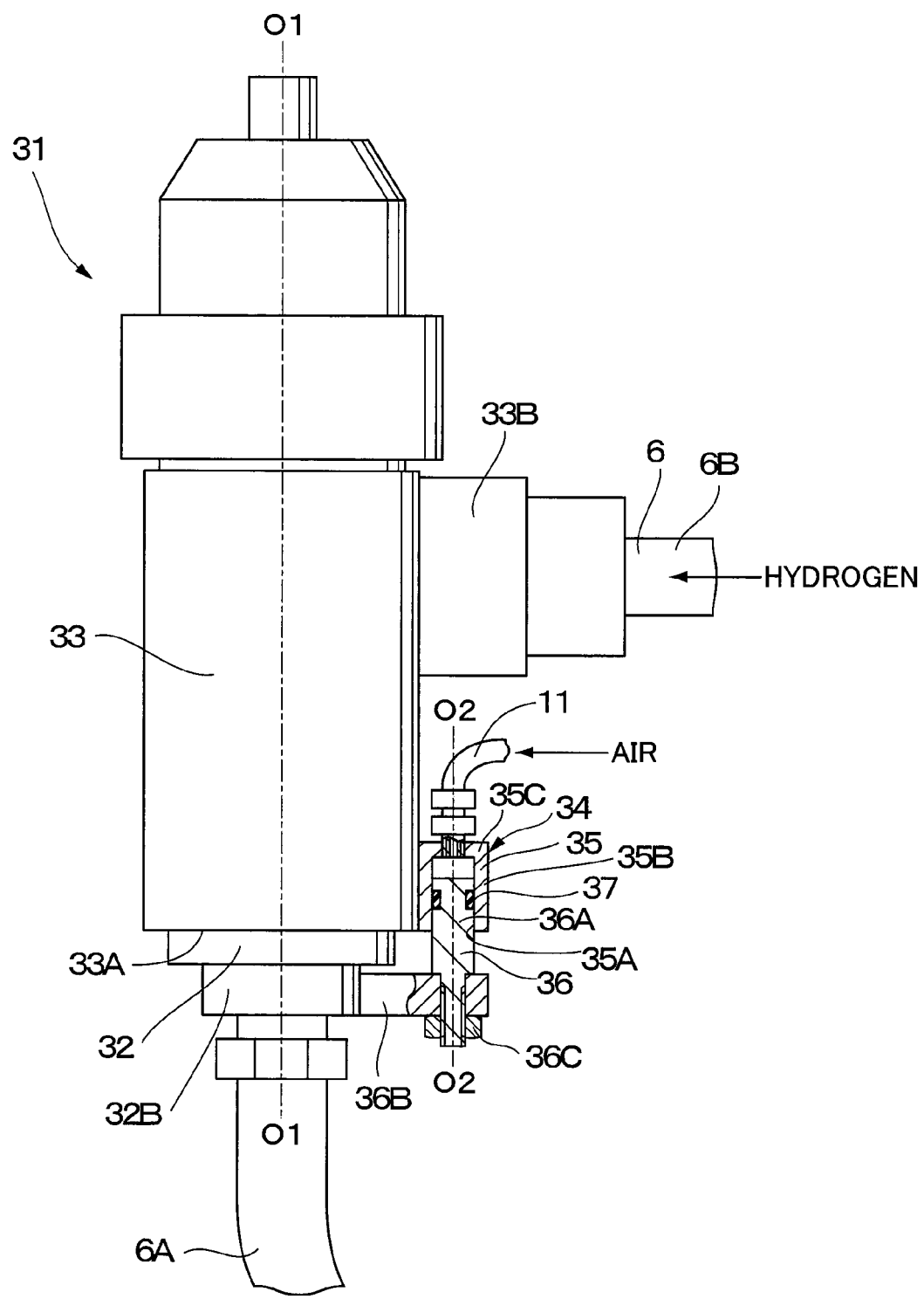
FIG. 3 is an enlarged view, partly in cross section, showing (III) part in FIG. 2.

The disconnect detecting device 34 detects the disconnect of the emergency breakaway coupling 31. That is, the disconnect detecting device 34 detects that the first coupler 32 and the second coupler 33 are disconnected. As shown in FIG. 3, the disconnect detecting device 34 is provided with a detecting piece 35 as a detecting part and a moving piece 36 as a moving part that are arranged in the emergency breakaway coupling 31 and is structured to seal instrumentation air by an O-ring 37. As shown in FIG. 3, the disconnect detecting device 34 can detect the disconnect of the first coupler 32 and the second coupler 33 by connecting the first coupler 32 and the second coupler 33. That is, the detecting piece 35 and the moving piece 36 of the disconnect detecting device 34 are arranged in positions in which detection of the disconnect following the connection of the first coupler 32 and the second coupler 33 is made possible. In other words, when the first coupler 32 and the second coupler 33 are connected, preparation of the detection of the disconnect detecting device 34 is made.

Figure 4:
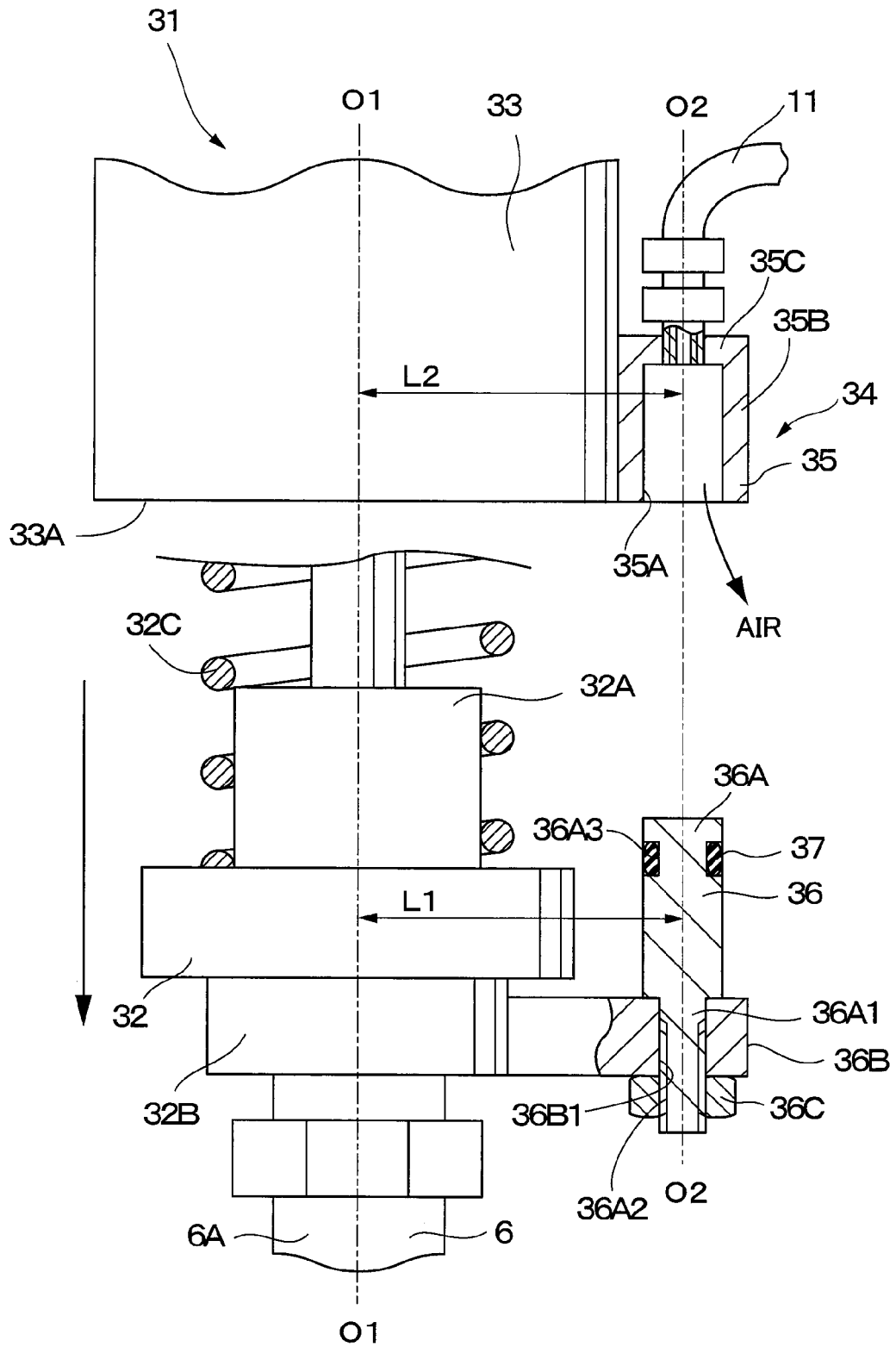
FIG. 4 is an enlarged view, partly in cross section, showing a state where the emergency breakaway coupling (the disconnect coupling) in FIG. 3 is disconnected.

As shown in FIG. 4, when the moving piece 36 is moved from the detecting piece 35 following the disconnect of the emergency breakaway coupling 31, the instrumentation air is released from the detecting piece 35-side to reduce a pressure of the instrumentation air. By detecting the pressure reduction in the instrumentation air by the pressure sensor 38, the disconnect detecting device 34 detects the disconnect of the emergency breakaway coupling 31. In addition, in the disconnect of the first coupler 32 and the second coupler 33, in a case of erroneous startup of a vehicle, the first coupler 32 and the second coupler 33 are largely disconnected from each other by a tension force and an inner pressure of gas, but, for example, in a case where the first coupler 32 and the second coupler 33 are disconnected caused by something at the non-pressure state, since a moving distance of the first coupler 32 becomes a distance caused by the fracture of the share pin and by a movement by self-weight of the first coupler 32 only, in some cases it becomes about several millimeters. In this case, by locating the position of the O-ring 37 disposed in the disconnect detecting device 34 in the vicinity of an opening part 35A, even in the disconnect state where the first coupler 32 is moved by about several millimeters, the air pressured is reduced by air leaked by a slight movement of a closing part 36A following the movement of the first coupler 32, thereby making it possible to quickly detect the disconnect.

That is, the disconnect detecting device 34 includes the detecting piece 35 (detecting part) disposed in the emergency breakaway coupling 31 on the second coupler 33-side and the moving piece 36 (moving part) disposed in the emergency breakaway coupling 31 on the first coupler 32-side. The detecting piece 35 and the moving piece 36 are connected by connecting the first coupler 32 and the second coupler 33. The detecting piece 35 and the moving piece 36 are separated following the disconnect of the first coupler 32 and the second coupler 33, whereby the disconnect of the first coupler 32 and the second coupler 33 is detected by the disconnect detecting device 34. In other words, when the first coupler 32 and the second coupler 33 are not disconnected, since detecting piece 35 and the moving piece 36 are not separated, the disconnect detecting device 34 detects that the first coupler 32 and the second coupler 33 are not disconnected.

Therefore, as shown in FIG. 1, the hydrogen gas filling device 1 is provided with a compressor 39 as a supply source (instrumentation air source) of compressed air, and the air supply pipeline 11 in which the compressed air flows from the compressor 39. The compressor 39 and the air supply pipeline 11 configure a gas supply device configured to supply gas into the disconnect detecting device 34. As the gas to be supplied by the gas supply device, gas different from the hydrogen gas to be filled into the tank 10 to be filled in the vehicle 9 as fuel, for example, compressed gas of compressed air, compressed nitrogen gas (compressed gas) or the like may be used.

The compressor 39 generates gas (hereinafter, referred to as instrumentation air, drive gas or compressed air) for driving valve devices of a pneumatic operation type, such as the flow rate adjusting valve 15 and the shutoff valve 16. The compressor 39 is a compressor to be driven, for example, by a drive source of an electric motor or the like and supplies the instrumentation air via the air supply pipeline 11 to the flow rate adjusting valve 15, the shutoff valve 16 and the like. In addition to this, the compressor 39 supplies the instrumentation air to the disconnect detecting device 34 as well. That is, in the embodiment the instrumentation air (compressed air) for operating (driving) the flow rate adjusting valve 15, the shutoff valve 16 and the like is used as gas for detecting the disconnect of the emergency breakaway coupling 31 by the disconnect detecting device 34. In other words, the compressor 39 can use the existing compressor installed from the beginning for driving the valve devices of a pneumatic operation type (the flow rate adjusting valve 15 and the shutoff valve 16). It should be noted that, for example, gas other than air of compressed nitrogen gas or the like may be used as the instrumentation gas.

The air supply pipeline 11 is arranged in the dispenser housing 4. The air supply pipeline 11 establishes connection between the compressor 39, and the flow rate adjusting valve 15 and the shutoff valve 16 as the valve devices of a pneumatic operation type. In addition, the air supply pipeline 11 establishes connection also between the compressor 39 and the disconnect detecting device 34. Further, the pressure sensor 38 is disposed in the middle of the air supply pipeline 11. As described later, when the emergency breakaway coupling 31 is disconnected, the instrumentation air is leaked from the disconnect detecting device 34. In this case, when the pressure of the instrumentation air is reduced, the flow rate adjusting valve 15 and the shutoff valve 16 cannot open. That is, in a case where the inner pressure in the disconnect detecting device 34 is reduced due to the disconnect of the emergency breakaway coupling 31, even when the shutoff valve 16 is opened, the shutoff valve 16 closes due to the pressure reduction in the air supply pipeline 11 as a drive gas supply line. In addition, it is possible to detect that the emergency breakaway coupling 31 is disconnected by detecting the pressure reduction by the pressure sensor 38.

As shown in FIG. 3 and FIG. 4, the disconnect detecting device 34 includes the detecting piece 35 and the moving piece 36 disposed in the emergency breakaway coupling 31. The detecting piece 35 is disposed in the second coupler 33. The moving piece 36 is disposed in the first coupler 32. The disconnect detecting device 34 detects that the emergency breakaway coupling 31 is disconnected based upon the movement of the moving piece 36 from the detecting piece 35.

The detecting piece 35 is formed in a bottomed cylindrical shape and has the opening part 35A. That is, the detecting piece 35 is provided with a cylinder part 35B in a cylindrical shape and a bottom part 35C closing one end side (upper end side in FIG. 3) of the cylinder part 35B. An air tube, that is, the air supply pipeline 11 is connected to the bottom part 35C. Thereby, an end part of the air supply pipeline 11 is connected to the detecting piece 35 of the disconnect detecting device 34, that is, the opening part 35A of the detecting piece 35. The cylinder part 35B of the detecting piece 35 is fixed to the side surface of the second coupler 33. In this case, a center axis O2-O2 of the cylinder part 35B of the detecting piece 35 is in parallel with the center axis O1-O1 of the attaching hole 33A of the second coupler 33.

The moving piece 36 has the closing part 36A that is formed in a columnar shape and closes the opening part 35A of the detecting piece 35 and a support part 36B supporting the closing part 36A on a base end side of the hose attaching part 32B of the first coupler 32. The closing part 36A closes the opening part 35A of the detecting piece 35 when a tip end side (an upper end side in FIG. 3) of the closing part 36A is inserted in the cylinder part 35B of the detecting piece 35. A base end side (a lower end side in FIG. 3) of the closing part 36A is formed as a small-diameter part 36A1, which is inserted in an attaching hole 36B1 of the support part 36B. A male screw 36A2 is formed in the small-diameter part 36A1 to be threaded into a nut 36C for attaching the closing part 36A on the support part 36B.

A section, which is inserted in the cylinder part 35B of the detecting piece 35, of the closing part 36A is provided with an attaching groove 36A3 in which the O-ring 37 is attached. The O-ring 37 seals between an inner peripheral surface of the cylinder part 35B of the detecting piece 35 and an outer peripheral surface of the closing part 36A of the moving piece 36 in a state where the opening part 35A of the detecting piece 35 is being closed by the closing part 36A of the moving piece 36. That is, the O-ring 37 is a sealing member blocking the instrumentation air from being leaked from between the inner peripheral surface of the cylinder part 35B of the detecting piece 35 and the outer peripheral surface of the closing part 36A of the moving piece 36.

The support part 36B extends in a direction perpendicular to the center axis O1-O1 of the insert part 32A of the first coupler 32. The support part 36B is provided with the attaching hole 36B1 for attaching the closing part 36A. The attaching hole 36B1 is formed in the support part 36B to be in parallel with the center axis O1-O1 of the insert part 32A of the first coupler 32. As a result, a center axis O2-O2 of the closing part 36A of the moving piece 36 is in parallel with the center axis O1-O1 of the insert part 32A of the first coupler 32.

Thereby, the detecting piece 35 and the moving piece 36 are arranged in the emergency breakaway coupling 31 such that a moving direction O2-O2 of the moving piece 36 moving from the detecting piece 35 is in parallel with a disconnecting direction O1-O1 of the first coupler 32 disconnecting from the second coupler 33. Further, as shown in FIG. 4, in a case where a distance between the center axis O2-O2 of the closing part 36A of the moving piece 36 and the center axis O1-O1 of the insert part 32A of the first coupler 32 is indicated by L1 and a distance between the center axis O2-O2 of the cylinder part 35B of the detecting piece 35 and the center axis O1-O1 of the attaching hole 33A of the second coupler 33 is indicated by L2, L1=L2.

In addition, the pressure sensor 38 as a pressure detecting device is disposed in the middle of the air supply pipeline 11. The pressure sensor 38 is connected to the control device 27. The pressure sensor 38 measures a pressure in the air supply pipeline 11 and outputs a detection signal in accordance with the measured pressure to the control device 27. In this case, the pressure sensor 38 can use the existing pressure sensor installed from the beginning for monitoring the instrumentation air driving the valve devices of a pneumatic operation type (the flow rate adjusting valve 15, the shutoff valve 16 and the like), for example. The pressure sensor 38 detects the pressure in the inside of the disconnect detecting device 34 by detecting the pressure in the air supply pipeline 11. In a case where the pressure sensor 38 detects that the pressure in the inside of the disconnect detecting device 34 is reduced, the disconnect detecting device 34 detects that the emergency breakaway coupling 31 is disconnected.

That is, as shown in FIG. 4, when the first coupler 32 and the second coupler 33 in the emergency breakaway coupling 31 are disconnected, the moving piece 36 of the disconnect detecting device 34 moves to the detecting piece 35 and the closing part 36A of the moving piece 36 gets out of the cylinder part 35B of the detecting piece 35. Thereby, the instrumentation air supplied via the air supply pipeline 11 into the disconnect detecting device 34 is released to an exterior from the detecting piece 35. As a result, the pressure in the air supply pipeline 11 is reduced, and the pressure sensor 38 detects the pressure of the instrumentation air in the air supply pipeline 11, that is, the pressure in the inside of the disconnect detecting device 34. The control device 27 determines that the emergency breakaway coupling 31 is disconnected by the detection of the pressure reduction by the pressure sensor 38. It should be noted that control processing by the control device 27, that is, control processing as shown in FIG. 5 will be described later.

The hydrogen gas filling device 1 according to the embodiment has the configuration as described above, and next, an explanation will be made of the filling work of the hydrogen gas by the hydrogen gas filling device 1.

When the hydrogen gas is filled into the tank 10 to be filled in the vehicle 9, a worker performing the filling work removes the filling nozzle 7 from the nozzle retainer 8. In addition, as shown by a dashed-two dotted line in FIG. 1, the filling nozzle 7 is connected to the filling port 10A of the tank 10 to be filled and the corresponding connection section is locked. In this state, when the worker of the filling work turns on the filling start switch 23, the control device 27 outputs an opening signal to the flow rate adjusting valve 15 and the shutoff valve 16 to open the flow rate adjusting valve 15 and the shutoff valve 16.

Thereby, the hydrogen gas in the gas accumulator 2 is filled via the hydrogen gas supply pipeline 5, the filling hose 6 and the filling nozzle 7 into the tank 10 to be filled in the vehicle 9. The control device 27 adjusts the opening degree of the flow rate adjusting valve 15 and the like by a preset control system (constant-pressure rise control system or constant-flow rate control system) or the like while monitoring the measurement result of the flowmeter 20, the pressure sensor 21 and the temperature sensor 22, for example. Thereby, the pressure and the flow rate of the hydrogen gas to be supplied into the hydrogen gas supply pipeline 5 can be controlled to an appropriate flowing state.

At this time, the control device 27 integrates flow rate pulses from the flowmeter 20 to calculate a filling quantity (mass) of the hydrogen gas and determines whether the filling quantity of the hydrogen gas has reached a preset target filling quantity or whether the pressure of the hydrogen gas detected by the pressure sensor 21 has reached a preset target filling pressure. When the filling quantity of the hydrogen gas is determined to have reached the target filling quantity (pressure), the flow rate adjusting valve 15 and the shutoff valve 16 are closed in response to signals from the control device 27 to finish the filling of the hydrogen gas into the tank 10 to be filled. It should be noted that also in a case where a worker operates the filling stop switch 24, the filling work is finished.

Next, the control device 27 executes the filling finish control processing in this state. In this filling finish control processing, the depressurization valve 26 is controlled to open from the closing state in response to a signal from the control device 27. When the depressurization valve 26 is opened, the depressurization pipeline 25 is opened to atmosphere, by which the gas on the filling nozzle 7-side is released to an exterior to reduce the pressure in the filling nozzle 7 to an atmospheric pressure level. In this state, a worker can remove the connection coupler 7A of the filling nozzle 7 from the filling port 10A of the tank 10 to be filled.

The filling nozzle 7 removed from the filling port 10A of the tank 10 to be filled is returned back to the nozzle retainer 8 on the dispenser housing 4-side by a worker and is manually retained thereto. The nozzle detector 29 disposed on the nozzle retainer 8 detects whether or not the filling nozzle 7 is returned back to the nozzle retainer 8. When the filling nozzle 7 is returned back to the nozzle retainer 8 and is retained thereto, a detection signal from the nozzle detector 29 is outputted to the control device 27. Thereby, the control device 27 determines that the filling work by the filling nozzle 7 is finished and becomes in the waiting state to the next filling work.

In addition, as shown in FIG. 4, in a case where the filling hose 6 is pulled by the erroneous startup of the vehicle or the like and the first coupler 32 and the second coupler 33 in the emergency breakaway coupling 31 are disconnected, the moving piece 36 of the disconnect detecting device 34 moves in relation to the detecting piece 35, the pressure in the air supply pipeline 11 is reduced. When the pressure in the air supply pipeline 11 detected by the pressure sensor 38, that is, the pressure in the inside of the disconnect detecting device 34 is reduced to be lower than a preset threshold value, the control device 27 determines that the emergency breakaway coupling 31 is disconnected. In this case, the control device 27 issues an alarm, for example and displays a warning on the displaying part 28, thus notifying that the emergency breakaway coupling 31 is disconnected.

Next, an explanation will be made of the filling control processing of the hydrogen gas to be executed in the control device 27 by referring to FIG. 5. It should be noted that the control processing in FIG. 5 is repeatedly executed in a predetermined control cycle (for example, 10 ms) during the power supply to the control device 27, for example.

When the control device 27 is activated, the control processing in FIG. 5 is started. At S1, the control device 27 determines whether or not the filling nozzle 7 is disengaged from the nozzle retainer 8. This determination can be made based upon a detection signal (an on-signal or an off-signal) of the nozzle detector 29. In a case where at S1 "NO" determination is made, that is, it is determined that the filling nozzle 7 is not disengaged from the nozzle retainer 8, the process at S1 is repeated. This case shows the waiting state before the filling work is started and waits for the filling nozzle 7 to be removed from the nozzle retainer 8. On the other hand, in a case where at S1 "YES" determination is made, that is, it is determined that the filling nozzle 7 is disengaged from the nozzle retainer 8, the process goes to S2.

At S2 the pressure in the instrumentation air is read in. That is, the pressure (=the pressure in the inside of the disconnect detecting device 34) in the air supply pipeline 11 to be detected by the pressure sensor 38 is read in. At subsequent S3, it is determined whether or not the pressure in the instrumentation air read in at S2 is equal to or more than a preset threshold value. The threshold value can be set as a determination value for determining that the emergency breakaway coupling 31 is disconnected, that is, as a value that when the pressure of the instrumentation air is lower than the value, it is considered that there is a high possibility that the emergency breakaway coupling 31 is disconnected. The threshold value is in advance set by experiments, calculations, simulations, for example or the like as such a value that it is possible to appropriately determine that the emergency breakaway coupling 31 is disconnected.

In a case where at S3 "YES" determination is made, that is, it is determined that the pressure in the instrumentation air is equal to or more than the preset threshold value, the process goes to S6. In this case, it is considered that the emergency breakaway coupling 31 is connected. On the other hand, in a case where at S3 "NO" determination is made, that is, it is determined that the pressure in the instrumentation air is smaller than the preset threshold value, it is considered that the emergency breakaway coupling 31 is disconnected. In this case, at S4 an alarm is issued. For example, an alarm buzzer is made to ring. In addition, at S5 a warning is displayed on the displaying part 28. For example, "filling not-allowable" is displayed on the displaying part 28 (error display). When at S4 the alarm is issued and at S5 the error display is made, the process goes to RETURN. In this case, since the hydrogen gas cannot be filled into the tank 10 to be filled, the processing in FIG. 5 ends.

On the other hand, in a case where at S3 "YES" determination is made and the process goes to S6, the filling control processing is executed. When at S6 the filling start switch 23 turns on, the flow rate adjusting valve 15 and the shutoff valve 16 are opened and the hydrogen gas is filled into the tank 10 to be filled from the inside of the gas accumulator 2. At this time, the control device 27 adjusts the opening degree of the flow rate adjusting valve 15 and the like by a preset control system or the like while monitoring the measurement result of the flowmeter 20, the pressure sensor 21 and the temperature sensor 22, for example. Thereby, the pressure and the flow rate of the hydrogen gas to be supplied into the hydrogen gas supply pipeline 5 can be controlled to an appropriate flowing state.

At S7 subsequent to S6, it is determined whether or not the filling of the hydrogen gas is finished. Specifically it is determined whether or not the filling quantity or filling pressure of the hydrogen gas has reached the preset target value. In a case where at S7 "NO" determination is made, that is, in a case where it is determined that the filling quantity or filling pressure of the hydrogen gas has not reached the preset target value, the process of S7 is repeatedly executed. In this case, the filling of the hydrogen gas into the tank 10 to be filled continues. On the other hand, at S7 "YES" determination is made, that is, in a case where it is determined that the filling quantity or filling pressure of the hydrogen gas has reached the preset target value, the filling of the hydrogen gas finishes. That is, the flow rate adjusting valve 15 and the shutoff valve 16 are closed, and the process goes to S8. Also in a case where a worker operates the filling stop switch 24, at S7 "YES" determination is made, and the process goes to S8.

At S8 the filling finish control processing is executed. At S8 the depressurization valve 26 opens from the closing state. Thereby, the depressurization pipeline 25 is opened to atmosphere, and the hydrogen gas on the filling nozzle 7-side is released to an exterior to reduce the pressure of the filling nozzle 7 to an atmospheric pressure. At S9 subsequent from S8, it is determined whether or not the filling nozzle 7 is returned back to the nozzle retainer 8. In a case where at S9 "NO" determination is made, that is, in a case where it is determined that the filling nozzle 7 is not returned back to the nozzle retainer 8, the process of S9 is repeatedly executed. In this case, the process waits for the filling nozzle 7 to be returned back to the nozzle retainer 8.

In a case where at S9 "YES" determination is made, that is, in a case where it is determined that the filling nozzle 7 is returned back to the nozzle retainer 8, the process goes to S10. At S10, as similar to S2 the pressure of the instrumentation air is read in. At subsequent S11, it is determined whether or not the pressure in the instrumentation air read in at S10 is equal to or more than a preset threshold value. In a case where at S11 "YES" determination is made, that is, it is determined that the pressure in the instrumentation air is equal to or more than the preset threshold value, the process goes to RETURN. In this case, since the emergency breakaway coupling 31 is connected, the process returns back to START, and the processing after S1 is repeatedly executed. On the other hand, in a case where at S11 "NO" determination is made, that is, it is determined that the pressure in the instrumentation air is lower than the preset threshold value, it is considered that the emergency breakaway coupling 31 is disconnected or abnormality of a failure of the pressure sensor 38 or the like is generated. In this case, at S12 an alarm is issued. In addition, at S13 a warning of "abnormality occurrence" is displayed on the displaying part 28 (error display). When at S12 the alarm is issued and at S13 the error display is made, the process goes to RETURN. In this case, since the hydrogen gas cannot be filled into the tank 10 to be filled, the processing in FIG. 5 ends.

It should be noted that in the control processing in FIG. 5, when the filling nozzle 7 is disengaged from the nozzle retainer 8 and when the filling nozzle 7 is returned back to the nozzle retainer 8, reading-in of pressure (air pressure) by the pressure sensor 38 is performed to determine whether or not the emergency breakaway coupling 31 is disconnected. However, not limited thereto, for example, during the period from when the filling nozzle 7 is disengaged from the nozzle retainer 8 until when the filling nozzle 7 is returned back to the nozzle retainer 8, the reading-in of pressure (air pressure) by the pressure sensor 38 may be all the time performed and it may be determined whether or not the emergency breakaway coupling 31 is disconnected. In any case, in a case where the pressure detected by the pressure sensor 38 is lower than the threshold value, the control device 27 can determine that the emergency breakaway coupling 31 is disconnected.

As described above, according to the first embodiment, the moving direction O2-O2 of the moving piece 36 moving from the detecting piece 35 following the disconnect of the emergency breakaway coupling 31 is in parallel with the disconnecting direction O1-O1 of the first coupler 32 disconnecting from the second coupler 33. Therefore, at the time of connecting the first coupler 32 and the second coupler 33 of the emergency breakaway coupling 31, as the first coupler 32 and the second coupler 33 are connected, the detecting piece 35 and the moving piece 36 of the disconnect detecting device 34 are also connected. That is, the work for connecting the first coupler 32 and the second coupler 33 and the work for connecting the detecting piece 35 and the moving piece 36 of the disconnect detecting device 34 can be performed together. As a result, it is not necessary to perform the work for connecting the detecting piece 35 and the moving piece 36 of the disconnect detecting device 34 after connecting the emergency breakaway coupling 31, making it possible to omit the labors and time. That is, it does not become necessary to individually perform "the work for connecting the first coupler 32 and the second coupler 33" and "the work for connecting the detecting piece 35 and the moving piece 36 of the disconnect detecting device 34", making it possible to reduce the labors and time of a worker.

In addition, according to the first embodiment, when the emergency breakaway coupling 31 is disconnected, the closing part 36A of the moving piece 36 moves from the opening part 35A of the detecting piece 35, and the instrumentation air supplied into the disconnect detecting device 34 from the air supply pipeline 11 is leaked to an exterior. By detecting a reduction in pressure due to the leak of the instrumentation air by the pressure sensor 38, it is possible to detect that the emergency breakaway coupling 31 is disconnected. In this case, the pressure sensor 38 is disposed in a position other than the emergency breakaway coupling 31, in other words, in the middle of the air supply pipeline 11 as a position away from the detecting piece 35 and the moving piece 36. Therefore, at the time of connecting the first coupler 32 and the second coupler 33 of the emergency breakaway coupling 31, the opening part 35A of the detecting piece 35 is needed only to be closed by the closing part 36A of the moving piece 36 following the connection of the first coupler 32 and the second coupler 33. As a result, in this point as well the labors and time of a worker can be reduced. In addition, since the disconnect detecting device 34 is configured by a seal of the O-ring 37 using instrumentation air, the disconnect detecting device 34 is not necessary to be formed in an explosion-protection specification or an influence to the disconnect force can be made small.

Figure 6:
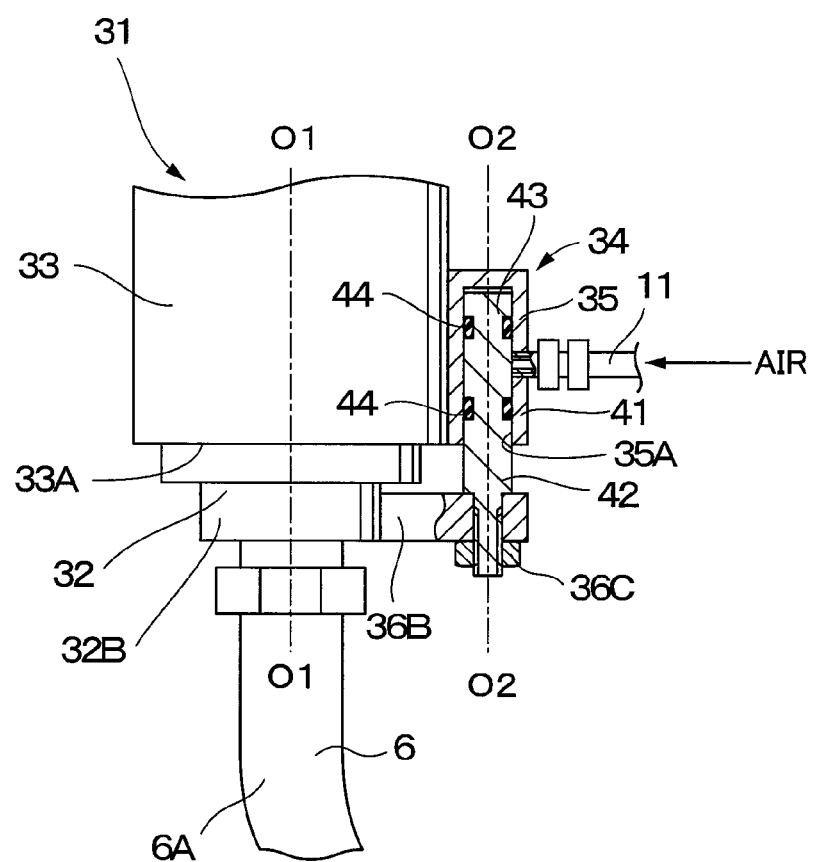
FIG. 6 is an enlarged view, partly in cross section, showing a disconnect detecting device and the like according to a first modification example.

It should be noted that in the first embodiment, the disconnect detecting device 34 is explained by taking as an example a case of connecting the air supply pipeline 11 to a bottom part 35C of the detecting piece 35. However, not limited thereto, for example, as a first modification example as shown in FIG. 6 the disconnect detecting device 34 may be configured such that the air supply pipeline 11 is connected to a cylinder part 41 of the detecting piece 35 and a pair of O-rings 44 are arranged in a closing part 43 of a moving piece 42 for the air supply pipeline 11 to be attached therebetween. In this case, a direction O2-O2 in which the moving piece 42 gets out of the detecting piece 35 can be made different from the direction in which the pressure of the instrumentation air is applied. That is, it is possible to suppress the pressure of the instrumentation air from being applied to the moving piece 42 in the direction of getting out of the detecting piece 35.

Figure 7:
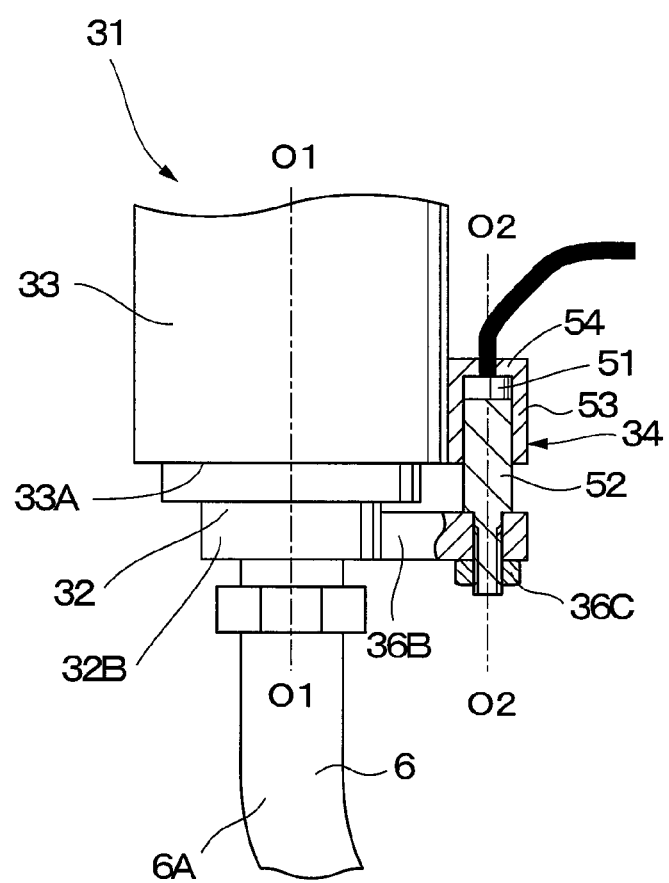
FIG. 7 is an enlarged view, partly in cross section, showing a disconnect detecting device and the like according to a second modification example.

In addition, the first embodiment is explained by taking as an example a case of detecting that the emergency breakaway coupling 31 as the disconnect coupling is disconnected due to the reduction in pressure of the pressure sensor 38. However, not limited thereto, the disconnect detecting device 34 as the detecting device may be configured to detect that the emergency breakaway coupling 31 is disconnected by a contact detecting device of a switch (contact switch), for example. That is, as a second modification example as shown in FIG. 7 the disconnect detecting device 34 may be configured to be provided with a contact switch 51 as the contact detecting device. In this case, the contact switch 51, which detects whether to be in contact with a moving piece 52 (specifically the contact switch 51 that turns on at the time of being in contact with the moving piece 52 and turns off at the time of being away from the moving piece 52), is disposed on a detecting piece 53.

In this case, for example, the contact switch 51 is disposed on a bottom part 54 of the detecting piece 53 in a bottomed, cylindrical shape. At the time of connecting the emergency breakaway coupling 31 as the disconnect coupling, the columnar moving piece 52 enters the detecting piece 53 in the bottomed cylindrical shape and the contact switch 51 can be pressed by the moving piece 52. When the emergency breakaway coupling 31 is disconnected, the moving piece 52 moves from the detecting piece 53 and the pressing on the contact switch 51 is released. Thereby, in a case where the contact switch 51 detects that the moving piece 52 is not in contact therewith, the disconnect detecting device 34 can detect that the emergency breakaway coupling 31 is disconnected. That is, the disconnect of the emergency breakaway coupling 31 may be detected by the event that the moving piece 52 does not become in contact with the contact switch 51.

In this case, when the emergency breakaway coupling 31 is disconnected, the moving piece 52 is away from the contact switch 51 following the movement of the moving piece 52 from the detecting piece 53. By detecting that the moving piece 52 comes to be not in contact with the contact switch 51, it is possible to detect that the emergency breakaway coupling 31 is disconnected. In this case, the contact switch 51 may be in advance disposed in the detecting piece 53. Therefore, at the time of connecting the first coupler 32 and the second coupler 33 of the emergency breakaway coupling 31, the moving piece 52 is needed only to be made to be in contact with the contact switch 51 following connection of the first coupler 32 and the second coupler 33. As a result, in this point as well the labors and time of a worker can be reduced.

The first embodiment and the respective modification examples are explained by taking as an example a case where the compressed hydrogen gas is filled into the tank 10 to be filled as the fuel tank in the vehicle 9. However, not limited thereto, the first embodiment and the respective modification examples may be applied, for example at the time of filling hydrogen gas into a tank to be filled (tank, a container or the like) other than a vehicle. Further, the dispenser unit 3 in the hydrogen gas filling device 1 may be installed in the middle of a pipeline (hydrogen gas feeding pipeline) for feeding the hydrogen gas to another place. This configuration is applied in the same way to a second embodiment as well to be described later. In addition, in the first embodiment and the respective modification examples, the disconnect coupling is disposed in the filling hose 6, but not limited thereto, may be disposed in a filling supply pipeline, and the hose 6B on the housing side may be a housing extension part that extends from a housing and is therein provided with a hydrogen gas feeding pipeline or a hydrogen gas supply pipeline. This configuration is applied in the same way to the second embodiment as well to be described later. In addition, in the first embodiment and the respective modification examples, the hydrogen gas supply pipeline 5 and the filling hose 6 are connected and the filling nozzle 7 is connected to an end part of the filling hose 6, but not limited thereto, a filling nozzle may be disposed on an end part of the hydrogen gas supply pipeline 5, and the filling hose 6 may be disposed in place of the hydrogen gas supply pipeline 5 in the inside of the housing. This configuration is applied in the same way to the second embodiment as well to be described later. In addition, in the first embodiment and the first modification example, the pressure sensor 38 is disposed in the pipeline in the housing, but not limited thereto, may be disposed in the detecting piece 35. As a result, since the pressure sensor is disposed outside of the housing, the attaching of the pressure sensor can easily be performed. This configuration is applied in the same way to the second embodiment as well to be described later.

Figure 8:
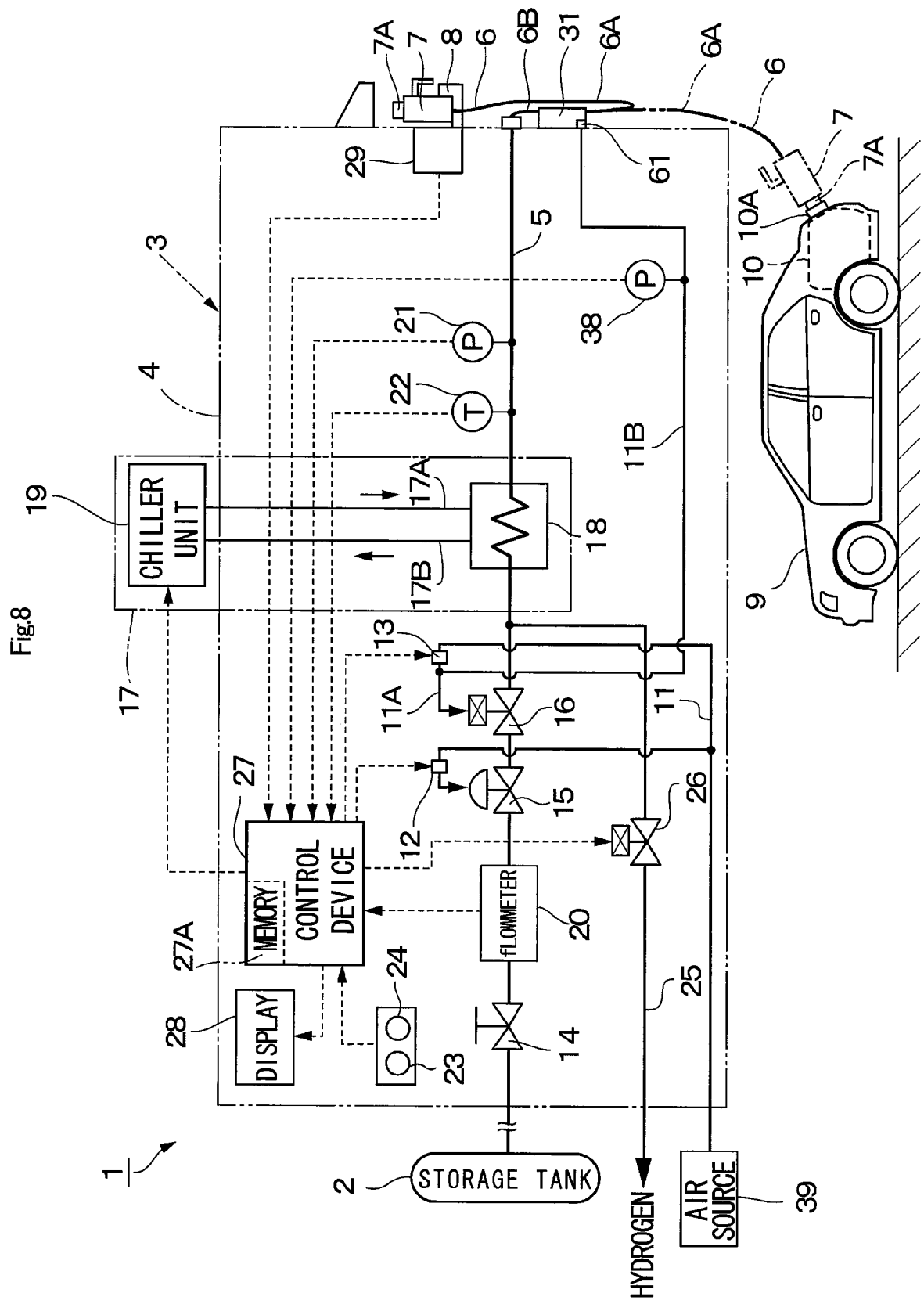
FIG. 8 is an overall configuration diagram schematically showing a hydrogen gas filling device according to a second embodiment.
Figure 9:
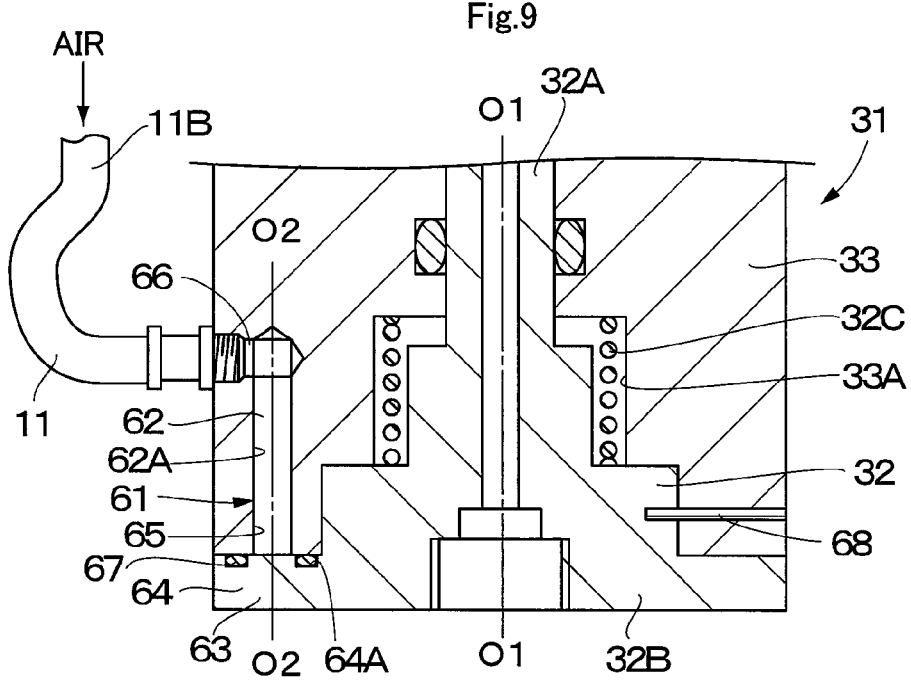
FIG. 9 is a cross section, in a position as substantially similar to FIG. 6, showing an emergency breakaway coupling (a disconnect coupling), a disconnect detecting device (a detecting device) and the like in FIG. 8.
Figure 10:
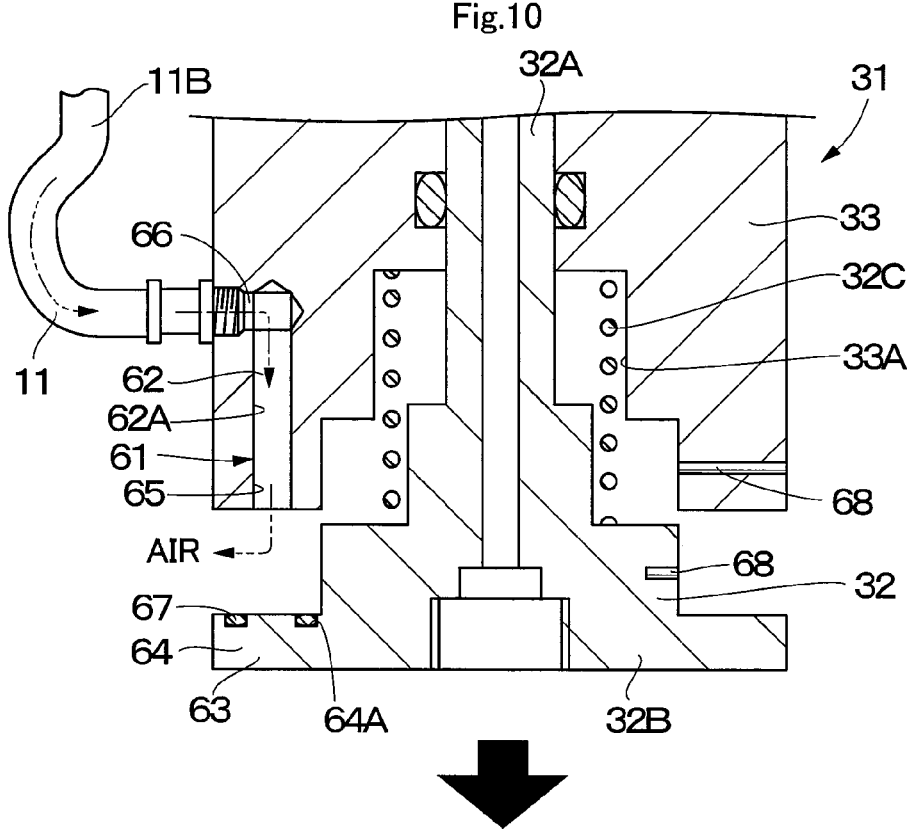
FIG. 10 is a cross section showing a state where the disconnect coupling in FIG. 9 is disconnected.

Next, FIG. 8 to FIG. 10 show the second embodiment. The second embodiment is characterized in that a moving part and a detecting part configuring a detecting device are configured to be disposed to be integral with a disconnect coupling (in other words, a moving part and a detecting part configuring a detecting device are configured to be housed in a disconnect coupling). It should be noted that in the second embodiment components identical to those in the first embodiment as described above are referred to as identical reference numerals, and an explanation thereof is omitted.

In the second embodiment also, as similar to the first embodiment, the emergency breakaway coupling 31 is provided with the first coupler 32 and the second coupler 33. A share pin 68 (FIG. 9 and FIG. 10) as a temporary connection member for temporarily connecting the first coupler 32 and the second coupler 33 is disposed between the first coupler 32 and the second coupler 33 such that the first coupler 32 and the second coupler 33 can be disconnected when a large force is applied therebetween. The share pin 68 fractures following the disconnect of the emergency breakaway coupling 31. In the second embodiment, as shown in FIG. 9 and FIG. 10, a disconnect detecting device 61 is housed in the emergency breakaway coupling 31. That is, a detecting part 62 and a moving part 63 of the disconnect detecting device 61 are housed in the first coupler 32 and the second coupler 33 of the emergency breakaway coupling 31.

The disconnect detecting device 61 is provided with the detecting part 62 and the moving part 63 and is structured to seal instrumentation air by an O-ring 67. The moving part 63 of the disconnect detecting device 61 is disposed to be integral with the first coupler 32. In this case, the first coupler 32 is provided with an insert part 32A that is removably inserted in the attaching hole 33A of the second coupler 33 and a flange part 64 that is positioned in a base end side of the insert part 32A (at the opposite side to the attaching hole 33A) and extends in a direction perpendicular to the center axis O1-O1 of the insert part 32A. The moving part 63 is configured by the flange part 64. The flange part 64 corresponds to an extension part extending in a horizontal direction. Therewith, the flange part 64 corresponds to a closing part closing an opening part 65 of the detecting part 62 disposed integrally with the second coupler 33. It should be noted that in the second embodiment, the flange part 64 is configured to extend across an entire periphery of the first coupler 32 in the peripheral direction, but may be configured such that a section only, which corresponds to the opening part 65 of the detecting part 62, of the flange part 64 extends radially (in a horizontal direction).

In the flange part 64, a seal groove 64A in a circular shape is formed in a position corresponding to the opening part 65 of the detecting part 62 to surround the opening part 65. The O-ring 67 is attached in the seal groove 64A. When the first coupler 32 and the second coupler 33 are connected, the O-ring 67 abuts on an end surface of the second coupler 33 and is compressed. As a result, when the first coupler 32 and the second coupler 33 are appropriately connected, the instrumentation air is blocked from being leaked from between the opening part 65 of the detecting part 62 and the flange part 64. In the second embodiment, since a sealing section (O-ring 67) is of a planar sealing structure, even when the first coupler 32 and the second coupler 33 are slightly disconnected, the instrumentation air is leaked from between the opening part 65 of the detecting part 62 and the flange part 64, making it possible to detect the disconnect.

The detecting part 62 of the disconnect detecting device 61 is disposed in the inside of the housing of the second coupler 33. That is, the second coupler 33 is provided with the attaching hole 33A in which the insert part 32A of the first coupler 32 is inserted, and a bottomed hole 62A disposed in parallel with the attaching hole 33A. The bottomed hole 62A corresponds to the detecting part 62 of the disconnect detecting device 61. The bottomed hole 62A opens on the side of facing the flange part 64, and this opening becomes the opening part 65 of the detecting part 62. Thereby, the detecting part 62 has the opening part 65. The opening part 65 is closed by the flange part 64 of the first coupler 32. A connection hole 66 extending in a direction perpendicular to the bottomed hole 62A is communicated with the bottomed hole 62A. The connection hole 66 penetrates between an outer periphery of the housing of the second coupler 33 and an inner wall of the bottomed hole 62A. An air tube, that is, the air supply pipeline 11 is attached in the connection hole 66. Thereby, an end part of the air supply pipeline 11 (branch pipeline 11B) is connected to the opening part 65. As shown in FIG. 10, when the first coupler 32 and the second coupler 33 are disconnected, the flange part 64 of the second coupler 33 is separated from the detecting part 62 (opening part 65) of the first coupler 32. As a result, the instrumentation air is released from the detecting part 62 (opening part 65), and the disconnect of the emergency breakaway coupling 31 can be detected based upon a change in pressure of the instrumentation air.

As shown in FIG. 8, in the second embodiment "the instrumentation air (compressed air for disconnect detection) for detecting the disconnect of the emergency breakaway coupling 31" is in common with "the instrumentation air (compressed air for shutoff valve operation) to be supplied to the shutoff valve 16 from the electromagnetic valve 13 performing the opening/closing of the shutoff valve 16 in the hydrogen gas supply pipeline 5". As a result, in the second embodiment also, as similar to the first embodiment, when the emergency breakaway coupling 31 is disconnected, it is possible to stop the shutoff valve 16 due to a reduction in pressure of the instrumentation air (compressed air or drive gas). Therefore, in the second embodiment also, as similar to the first embodiment, in a state where the emergency breakaway coupling 31 is disconnected, even when the supply of the hydrogen gas is started (for example, even when the flow rate adjusting valve 15 opens), the shutoff valve 16 does not open. Thereby, the leak of the hydrogen gas can be suppressed.

Therefore, the second embodiment as well, as similar to the first embodiment, is provided with the air supply pipeline 11 as a drive gas supply line. The air supply pipeline 11 supplies the instrumentation air (compressed air as drive gas) to the flow rate adjusting valve 15, the shutoff valve 16 and the disconnect detecting device 61. In the first embodiment, as shown in FIG. 1 as described before, the compressor 39 as a supply source of the instrumentation air is directly connected to the detecting piece 35 of the disconnect detecting device 34. On the other hand, the second embodiment is provided with the branch pipeline 11B branching from the connection pipeline 11A connecting the electromagnetic valve 13 and the shutoff valve 16. The branch pipeline 11B is connected to the detecting part 62 of the disconnect detecting device 61. In this way, in the second embodiment the detecting part 62 of the disconnect detecting device 61 is connected to the compressor 39 via the electromagnetic valve 13 controlling the supply of the instrumentation air for opening the shutoff valve 16.

The shutoff valve 16 is disposed in the hydrogen gas supply pipeline 5 connecting the gas accumulator 2 and the filling hose 6. The air supply pipeline 11 supplying the instrumentation air is connected to the shutoff valve 16. The shutoff valve 16 is, in a case where a pressure of the instrumentation air to be supplied thereto is a predetermined pressure (or higher than the predetermined pressure), maintained to be opened. The predetermined pressure, in a case where the pressure in the inside of the disconnect detecting device 61 is reduced due to the disconnect of the emergency breakaway coupling 31, corresponds to a value (for example, 0.5 MPa) in which the shutoff valve 16 closes due to a pressure reduction in the air supply pipeline 11. That is, when the pressure of the instrumentation air to be supplied to the shutoff valve 16 via the air supply pipeline 11 (the pressure in the air supply pipeline 11) is reduced to be lower than the predetermined pressure, the shutoff valve 16 is closed. Therefore, in a case where the emergency breakaway coupling 31 is disconnected in the middle of filling the hydrogen gas, the shutoff valve 16 is automatically closed, making it possible to stop the filling. On the other hand, in a case where the emergency breakaway coupling 31 is disconnected before the filling start of the hydrogen gas, since the shutoff valve 16 does not open, "filling not-allowable" can be set.

The second embodiment performs the filling as described above and is not particularly different in a basic function from the first embodiment as described above. That is, in the second embodiment as well, as similar to the first embodiment, the detecting part 62 is provided with the opening part 65. In addition, the moving part 63 is provided with the flange part 64 as a closing part closing the opening part 65 of the detecting part 62. Therefore, in a state where the first coupler 32 and the second coupler 33 are connected, the flange part 64 of the moving part 63 closes the opening part 65 of the detecting part 62. Thereby, when the first coupler 32 and the second coupler 33 are disconnected, the flange part 64 of the moving part 63 moves from the opening part 65 of the detecting part 62. As a result, it is possible to detect that the emergency breakaway coupling 31 is disconnected, that is, the first coupler 32 and the second coupler 33 are disconnected.

In the second embodiment, the moving part 63 is disposed in the first coupler 32 and is the flange part 64 as an extension part extending in the horizontal direction. The detecting part 62 is formed as the bottomed hole 62A disposed in the housing of the second coupler 33, and the opening of the bottomed hole 62A becomes the opening part 65 to be closed by the flange part 64 as the closing part. Therefore, in a state where the first coupler 32 and the second coupler 33 are connected, the flange part 64 of the first coupler 32 closes the opening part 65 of the detecting part 62 disposed in the housing of the second coupler 33. Thereby, when the first coupler 32 and the second coupler 33 are disconnected, the flange part 64 of the first coupler 32 moves (is separated) from the opening part 65 of the second coupler 33. As a result, it is possible to detect that the emergency breakaway coupling 31 is disconnected. In addition, the moving part 63 (flange part 64) and detecting part 62 are disposed to be integral with the emergency breakaway coupling 31. More specifically, the moving part 63 (flange part 64) is disposed to be integral with the first coupler 32, and the detecting part 62 is disposed to be integral with the second coupler 33. Therefore, miniaturization and cost reduction of the disconnect detecting device 61 can be accomplished.

In the second embodiment as well, as similar to the first embodiment, in a case where the pressure in the inside of the disconnect detecting device 61 is reduced by the disconnect of the emergency breakaway coupling 31, the shutoff valve 16 is closed due to a reduction in pressure in the air supply pipeline 11. Therefore, when the emergency breakaway coupling 31 is disconnected, the shutoff valve 16 can certainly be closed. Thereby, it is possible to certainly suppress the hydrogen gas from flowing out following the disconnect of the emergency breakaway coupling 31.

In the second embodiment as well, as similar to the first embodiment, the pressure sensor 38 is disposed in the air supply pipeline 11. The pressure sensor 38 corresponds to a pressure detecting device configured to detect the pressure in the inside of the disconnect detecting device 61. The pressure sensor 38 is connected to the control device 27. Therefore, the control device 27, in a case where by the pressure sensor 38, it is detected that the pressure (=the pressure in the inside of the disconnect detecting device 61) in the air supply pipeline 11 is reduced, can detect that the emergency breakaway coupling 31 is disconnected. That is, the control device 27 can detect a reduction in pressure of the instrumentation air in the air supply pipeline 11 due to the disconnect of the emergency breakaway coupling 31 by the pressure sensor 38. Therefore, at the time of outputting an opening signal to the electromagnetic valve 13 opening/closing the shutoff valve 16 from the control device 27, for example, the control device 27 can detect that the emergency breakaway coupling 31 is disconnected based upon the reduction in pressure detected by the pressure sensor 38. Therefore, when the emergency breakaway coupling 31 is disconnected, the control device 27 can perform necessary control of notifying a worker of this disconnect or the like. It should be noted that since the shutoff valve 16 can be closed without the pressure sensor 38, the pressure sensor 38 may be omitted.

The second embodiment is explained by taking as an example a case of using the bottomed hole 62A as the detecting part 62 of the disconnect detecting device 61. That is, in the second embodiment the detecting part 62 is configured of the bottomed hole 62A, and the connection hole 66 extending in the direction perpendicular to the bottomed hole 62A is made to be communicated with the bottomed hole 62A and the end part of the air supply pipeline 11 is connected to the connection hole 66. However, not limited thereto, for example, a through hole extending in parallel with an attaching hole of a second coupler is disposed in the second coupler, and this through hole may be used as a detecting part of a detecting device. In this case, an opening of the through hole on the one end side becomes an opening part of the detecting part and an end part of an air supply pipeline as a drive gas supply line can be connected to an opening of the through hole on the other end side.

The first embodiment and the second embodiment are explained by taking as an example a case where "the air supply line (drive gas supply line) supplying the instrumentation air for driving the shutoff valve 16" and "the air supply line (detection gas supply line) supplying the instrumentation air to the disconnect detecting device 34, 61" are configured in the same system, that is, an air source is the air supply pipeline 11 in common therebetween. However, not limited thereto, "a drive gas supply line supplying drive gas (compressed air) for driving a shutoff valve" and "a detection gas supply line supplying gas (compressed air) to a detecting device" may be configured in different systems, that is, air sources may be different supply pipelines.

For example, aspects described below are conceived as a hydrogen gas filling device based upon the embodiment as explained above.

A hydrogen gas filling device according to a first aspect, which includes a filling nozzle connected to a gas supply pipeline via a gas supply connection line and uses the filling nozzle to fill hydrogen gas into a fuel tank in a vehicle, comprises: a disconnect coupling that includes a first coupler connected to the gas supply connection line on the side of the filling nozzle and a second coupler connected to the gas supply connection line on the side of the gas supply pipeline, wherein the first coupler and the second coupler are connected under normal conditions and the first coupler and the second coupler are disconnected during an emergency; and a detecting device configured to detect that the first coupler and the second coupler are disconnected, characterized in that: the detecting device includes: a detecting part disposed in the disconnect coupling on the side of the second coupler; and a moving part disposed in the disconnect coupling on the side of the first coupler, wherein the first coupler and the second coupler are connected to connect the detecting part and the moving part, and following the disconnect between the first coupler and the second coupler, the detecting part and the moving part are separated to detect the disconnect between the first coupler and the second coupler.

According to the first aspect, it is possible to detect that the disconnect coupling (the first coupler and the second coupler) is disconnected by the detecting device. In addition, the detecting part and the moving part are connected by connecting the first coupler and the second coupler. Thereby, it is possible to detect the disconnect of the first coupler and the second coupler. Therefore, the labors and time for attaching the detecting device provided with the detecting part and the moving part can be reduced.

As a second aspect, in the first aspect the detecting part and the moving part are arranged in the disconnect coupling in such away that a moving direction of the moving part moving from the detecting part is in parallel with a disconnecting direction of the first coupler disconnecting from the second coupler.

According to the second aspect, the moving direction of the moving part moving from the detecting part following the disconnect of the disconnect coupling is in parallel with the disconnecting direction of the first coupler disconnecting from the second coupler. Therefore, at the time of connecting the first coupler and the second coupler, the detecting part and the moving part in the detecting device are also connected by connecting the first coupler and the second coupler. That is, the work for connecting the first coupler and the second coupler and the work for connecting the detecting part and the moving part in the detecting device can be performed together. As a result, the work for connecting the detecting part and the moving part in the detecting device after connecting the disconnect coupling becomes unnecessary, making it possible to omit the labors and time. That is, it becomes unnecessary to perform "the work for connecting the first coupler and the second coupler" and "the work for connecting the detecting part and the moving part in the detecting device" individually, making it possible to omit the labors and time of a worker.

As a third aspect, in the first aspect and in the second aspect the detecting part includes an opening part and the moving part includes a closing part for closing the opening part of the detecting part.

According to the third aspect, in a state where the first coupler and the second coupler are connected, the closing part of the moving part closes the opening part of the detecting part. Therefore, when the first coupler and the second coupler are disconnected, the closing part of the moving part moves from the opening part of the detecting part. Thereby, it is possible to detect that the disconnect coupling is disconnected, that is, the first coupler and the second coupler are disconnected.

As a fourth aspect, in the third aspect the moving part includes an extension part that is disposed in the first coupler and extends in a horizontal direction and the detecting part is disposed in the inside of a housing of the second coupler and includes the opening part that is closed by the extension part as the closing part.

According to the fourth aspect, in a state where the first coupler and the second coupler are connected, the extension part in the first coupler as the closing part of the moving part closes the opening part of the detecting part disposed in the inside of the housing of the second coupling. Therefore, when the first coupler and the second coupler are disconnected, the extension part in the first coupler moves from the moving part in the second coupler. Thereby, it is possible to detect that the disconnect coupling is disconnected, that is, the first coupler and the second coupler are disconnected. In addition, the moving part (extension part) and the detecting part are arranged to be integral with the disconnect coupling. That is, the moving part (extension part) is disposed to be integral with the first coupler, and the detecting part is disposed to be integral with the second coupler. Therefore, the miniaturization and cost reduction of the detecting device can be accomplished.

As a fifth aspect, in the third aspect and in the fourth aspect a gas supply device configured to supply gas in the inside of the detecting device and a pressure detecting device configured to detect a pressure in the inside of the detecting device are arranged, wherein the detecting device detects that the disconnect coupling is disconnected in a case of detecting that the pressure in the inside of the detecting device is reduced by the pressure detecting device.

According to the fifth aspect, when the disconnect coupling is disconnected, the closing part of the moving part moves from the opening part of the detecting part, and the gas to be supplied in the inside of the detecting device from the gas supply device is leaked out. It is possible to detect that the disconnect coupling is disconnected on a basis that the pressure detecting device detects a reduction in pressure due to the leak of the gas. In this case, the pressure detecting device may be disposed in a section different from the disconnect coupling, in other words, in a position away from the detecting part and the moving part in the detecting device. Therefore, at the time of connecting the first coupler and the second coupler, the opening part of the detecting part is needed only to be closed by the closing part of the moving part following the connection of the first coupler and the second coupler. As a result, also from this point of view, it is possible to reduce the labors and time of a worker.

As a sixth aspect, in the third aspect and in the fourth aspect the gas supply pipeline is provided therein with a shutoff valve, which is maintained to open by drive gas in a case where the drive gas to be supplied has a predetermined pressure, a drive gas supply line to supply the drive gas is connected to the shutoff valve and the opening part is connected to an end part of the drive gas supply line, wherein in a case wherein the pressure in the inside of the detecting device is reduced due to the disconnect of the disconnect coupling, the shutoff valve closes due to a reduction in pressure in the drive gas supply line.

According to the sixth aspect, the shutoff valve closes following the reduction in pressure in the inside of the detecting device. Therefore, when the disconnect coupling is disconnected, the shutoff valve can certainly be closed. Thereby, it is possible to certainly suppress the hydrogen gas from flowing out following the disconnect of the disconnect coupling.

As a seventh aspect, in the sixth aspect a pressure detecting device is provided to detect a pressure in the inside of the detecting device, wherein the detecting device detects that the disconnect coupling is disconnected in a case of detecting that the pressure in the inside of the detecting device is reduced by the pressure detecting device.

According to the seventh aspect, it is possible to detect the reduction in pressure of the drive gas in the drive gas supply line due to the disconnect of the disconnect coupling by the pressure detecting device. Therefore, when the disconnect coupling is disconnected, necessary control can be executed based upon the detection of the pressure detecting device.

As an eighth aspect, in any of first-fourth and sixth a contact detecting device is disposed in the detecting part to detect whether to be in contact with the moving part, wherein the detecting device detects that the disconnect coupling is disconnected in a case of detecting that the moving part is not in contact with the contact detecting device by the contact detecting device.

According to the eighth aspect, when the disconnect coupling is disconnected, the moving part becomes away from the contact detecting device following the movement of the moving part from the detecting part. It is possible to detect that the disconnect coupling is disconnected by detecting that the moving part is not in contact by the contact detecting device. In this case, the contact detecting device can be disposed in the detecting part in advance. Therefore, at the time of connecting the first coupler and the second coupler, the moving part is needed only to be made in contact with the contact detecting device following the connection of the first coupler and the second coupler. As a result, also from this point of view, the labors and time of a worker can be reduced.

It should be noted that the embodiments and modification examples of the present invention are explained, but the present invention is not limited to the above-mentioned embodiments and modification examples but contains various modification examples. For example, the above-mentioned embodiments and modification examples are in detail explained for easy understanding of the present invention, and the present invention is not necessarily limited to those provided with all the components as explained. In addition, part of the components in one embodiment can be replaced by the component of the other embodiment or modification example, or the component of one embodiment or modification example can be added to the component of the other embodiment. In addition, part of the components in each of the embodiments can be subject to addition, delete or replacement of the other component.

The present application claims the priority based upon Japanese Patent Application No. 2020-062306 of the application dated on Mar. 31, 2020. All the disclosure contents including the specification, the claims, the figures and the abstract in Japanese Patent Application No. 2020-062306 of the application dated on Mar. 31, 2020 are by reference incorporated in the present specification as a whole.

DESCRIPTION OF REFERENCE NUMERALS

1: HYDROGEN GAS FILLING DEVICE
4: DISPENSER HOUSING (HOUSING)
5: HYDROGEN GAS SUPPLY PIPELINE (GAS SUPPLY PIPELINE)
6: FILLING HOSE (GAS SUPPLY CONNECTION LINE)
6A: FIRST HOSE (GAS SUPPLY CONNECTION LINE ON HOUSING SIDE)
6B: SECOND HOSE (GAS SUPPLY CONNECTION LINE ON FILLING NOZZLE SIDE)
7: FILLING NOZZLE
9: VEHICLE
10: TANK TO BE FILLED (FUEL TANK)
11: AIR SUPPLY PIPELINE (GAS SUPPLY DEVICE OR DRIVE GAS SUPPLY LINE)
31: EMERGENCY BREAKAWAY COUPLING (DISCONNECT COUPLING)
32: FIRST COUPLER
33: SECOND COUPLER
34, 61: DISCONNECT DETECTING DEVICE (DETECTING DEVICE)
35, 53: DETECTING PIECE (DETECTING PART)
35A: OPENING PART
36, 42, 52: MOVING PIECE (MOVING PART)
36A, 43: CLOSING PART
38: PRESSURE SENSOR (PRESSURE DETECTING DEVICE)
39: COMPRESSOR (GAS SUPPLY DEVICE)
51: CONTACT SWITCH (CONTACT DETECTING DEVICE)
62: DETECTING PART
63: MOVING PART
64: FLANGE PART (CLOSING PART OR EXTENSION PART)
65: OPENING PART
O1-O1: DISCONNECTING DIRECTION (CENTER AXIS)
O2-O2: MOVING DIRECTION (CENTER AXIS)

The invention claimed is:

1. A hydrogen gas filling device, comprising:
a gas supply pipeline;
a gas supply connection line;
a filling nozzle connected to the gas supply pipeline via the gas supply connection line, the filling nozzle being configured to fill hydrogen gas into a fuel tank in a vehicle;
a disconnect coupling that includes a first coupler connected to the gas supply connection line on the side of the filling nozzle and a second coupler connected to the gas supply connection line on the side of the gas supply pipeline, wherein the first coupler and the second coupler are configured to be connected under normal conditions and the first coupler and the second coupler are configured to be disconnected during an emergency; and
a detecting device configured to detect that the first coupler and the second coupler are disconnected, wherein
the detecting device includes:
a detecting part disposed in the disconnect coupling on a side of the second coupler;
a moving part disposed in the disconnect coupling on a side of the first coupler, wherein the detecting part and the moving part are configured to be connected in a state in which the first coupler and the second coupler are connected; and
a pressure sensor configured to detect a pressure of gas provided into the detecting device, and
the detecting part and the moving part are configured to be separated to detect, via the pressure sensor, the disconnect between the first coupler and the second coupler.

2. The hydrogen gas filling device according to claim 1, wherein
the detecting part and the moving part are configured to disconnect in a direction that is parallel to a direction in which the first coupler and the second coupler are configured to disconnect.

3. The hydrogen gas filling device according to claim 1, wherein
the detecting part includes an opening, and
the moving part includes a closing part configured to close the opening of the detecting part.

4. The hydrogen gas filling device according to claim 3, wherein
the moving part includes a flange that is disposed in the first coupler, the flange extending in a horizontal direction, and
the detecting part includes the opening that is disposed in the inside of a housing of the second coupler and is configured to be closed engaging with the flange.

5. The hydrogen gas filling device according to claim 3, further comprising:
a gas supply device configured to supply the gas to the inside of the detecting device, wherein the detecting device is configured to detect that the disconnect coupling is disconnected in a state in which the pressure, detected by the pressure sensor, inside of the detecting device is reduced.

6. The hydrogen gas filling device according to claim 3, wherein
the gas supply pipeline is provided with a shutoff valve, the shutoff valve being configured to open by drive gas in a state in which the drive gas is supplied at a predetermined pressure,
a drive gas supply line to supply the drive gas is connected to the shutoff valve, and
the opening is connected to an end part of the drive gas supply line, such that in a state in which the pressure in the inside of the detecting device is reduced by the disconnect of the disconnect coupling, the shutoff valve is configured to close due to a reduction in pressure in the drive gas supply line.

7. A hydrogen gas filling device, comprising:
a gas supply pipeline;
a gas supply connection line;

a filling nozzle connected to the gas supply pipeline via the gas supply connection line, the filling nozzle being configured to fill hydrogen gas into a fuel tank in a vehicle;
a disconnect coupling that includes a first coupler connected to the gas supply connection line on the side of the filling nozzle and a second coupler connected to the gas supply connection line on the side of the gas supply pipeline, wherein the first coupler and the second coupler are configured to be connected under normal conditions and the first coupler and the second coupler are configured to be disconnected during an emergency; and
a detecting device configured to detect that the first coupler and the second coupler are disconnected, wherein
the detecting device includes:
  a detecting part disposed in the disconnect coupling on a side of the second coupler;
  a moving part disposed in the disconnect coupling on a side of the first coupler, wherein the detecting part and the moving part are configured to be connected in a state in which the first coupler and the second coupler are connected; and
  a contact switch configured to detect whether to be in contact with the moving part, and
the detecting part and the moving part are configured to be separated to detect, via the contact switch, the disconnect between the first coupler and the second coupler.

* * * * *